United States Patent
Lindemann

(10) Patent No.: US 9,961,077 B2
(45) Date of Patent: *May 1, 2018

(54) SYSTEM AND METHOD FOR BIOMETRIC AUTHENTICATION WITH DEVICE ATTESTATION

(71) Applicant: Nok Nok Labs, Inc., Palo Alto, CA (US)

(72) Inventor: Rolf Lindemann, Steele (DE)

(73) Assignee: NOK NOK LABS, INC., Palo Alto, CA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 14/066,273

(22) Filed: Oct. 29, 2013

(65) Prior Publication Data

US 2016/0241552 A1 Aug. 18, 2016

Related U.S. Application Data

(60) Provisional application No. 61/829,081, filed on May 30, 2013.

(51) Int. Cl.
*H04L 29/06* (2006.01)
*G06F 21/32* (2013.01)
(Continued)

(52) U.S. Cl.
CPC .......... *H04L 63/0861* (2013.01); *G06F 21/32* (2013.01); *G06F 21/44* (2013.01);
(Continued)

(58) Field of Classification Search
CPC .......... G06F 21/32; G06F 21/44; G06F 21/57; G07C 9/00087; G07C 9/00158;
(Continued)

(56) References Cited

U.S. PATENT DOCUMENTS 5,280,527 A 1/1994 Gullman et al.
5,764,789 A 6/1998 Pare, Jr. et al.
(Continued)

FOREIGN PATENT DOCUMENTS

CN 1705925 A 12/2005
CN 101394283 A 3/2009
(Continued)

OTHER PUBLICATIONS

Brickell, Ernie, Jan Camenisch, and Liqun Chen. "Direct anonymous attestation." *Proceedings of the 11th ACM conference on Computer and communications security*. ACM, 2004, 6 pages.
(Continued)

*Primary Examiner* — Hadi S Armouche
*Assistant Examiner* — Sakinah White Taylor
(74) *Attorney, Agent, or Firm* — Nicholson De Vos Webster & Elliott LLP

(57) ABSTRACT

A system, apparatus, method, and machine readable medium are described for biometric device attestation. For example, one embodiment of an apparatus includes: a biometric device to read biometric authentication data from a user and determine whether to successfully authenticate the user based on a comparison with biometric reference data; and a cryptographic engine to establish communication with a relying party and to attest to the model and/or integrity of the biometric device to the relying party.

21 Claims, 7 Drawing Sheets

(51) Int. Cl.
　　*G06F 21/44*　　(2013.01)
　　*G06F 21/57*　　(2013.01)
　　*H04L 9/32*　　(2006.01)

(52) U.S. Cl.
　　CPC ............ *G06F 21/57* (2013.01); *H04L 9/3231* (2013.01); *H04L 9/3234* (2013.01)

(58) Field of Classification Search
　　CPC ..... H04L 9/32; H04L 63/0861; H04L 9/3231; H04L 9/3234; G06Q 20/40145
　　USPC ....................................................... 713/186
　　See application file for complete search history.

(56) References Cited

U.S. PATENT DOCUMENTS

| | | | |
|---|---|---|---|
| 6,088,450 A | 7/2000 | Davis et al. | |
| 6,178,511 B1 | 1/2001 | Cohen et al. | |
| 6,377,691 B1 | 4/2002 | Swift et al. | |
| 6,618,806 B1 | 9/2003 | Brown et al. | |
| 6,751,733 B1 * | 6/2004 | Nakamura | G06F 21/32 713/155 |
| 6,842,896 B1 | 1/2005 | Redding et al. | |
| 6,938,156 B2 | 8/2005 | Wheeler et al. | |
| 7,155,035 B2 | 12/2006 | Kondo et al. | |
| 7,194,763 B2 | 3/2007 | Potter et al. | |
| 7,263,717 B1 | 8/2007 | Boydstun et al. | |
| 7,444,368 B1 | 10/2008 | Wong et al. | |
| 7,487,357 B2 | 2/2009 | Smith | |
| 7,512,567 B2 | 3/2009 | Bemmel et al. | |
| 7,698,565 B1 | 4/2010 | Bjorn et al. | |
| 7,865,937 B1 | 1/2011 | White | |
| 7,941,669 B2 | 5/2011 | Foley et al. | |
| 8,060,922 B2 | 11/2011 | Crichton | |
| 8,166,531 B2 | 4/2012 | Suzuki | |
| 8,245,030 B2 | 8/2012 | Lin | |
| 8,284,043 B2 | 10/2012 | Judd et al. | |
| 8,291,468 B1 | 10/2012 | Chickering | |
| 8,353,016 B1 | 1/2013 | Pravetz et al. | |
| 8,359,045 B1 | 1/2013 | Hopkins, III | |
| 8,458,465 B1 | 6/2013 | Stern et al. | |
| 8,489,506 B2 | 7/2013 | Hammad et al. | |
| 8,516,552 B2 | 8/2013 | Raleigh | |
| 8,555,340 B2 | 10/2013 | Potter et al. | |
| 8,561,152 B2 | 10/2013 | Novak et al. | |
| 8,584,224 B1 | 11/2013 | Pei et al. | |
| 8,607,048 B2 | 12/2013 | Nogawa | |
| 8,646,060 B1 | 2/2014 | Ben Ayed | |
| 8,713,325 B2 | 4/2014 | Ganesan | |
| 8,719,905 B2 | 5/2014 | Ganesan | |
| 8,776,180 B2 | 7/2014 | Kumar et al. | |
| 8,856,541 B1 | 10/2014 | Chaudhury et al. | |
| 8,949,978 B1 | 2/2015 | Lin | |
| 8,958,599 B1 | 2/2015 | Starner | |
| 8,978,117 B2 | 3/2015 | Bentley et al. | |
| 9,015,482 B2 | 4/2015 | Baghdasaryan et al. | |
| 9,032,485 B2 | 5/2015 | Chu | |
| 9,083,689 B2 | 7/2015 | Lindemann et al. | |
| 9,161,209 B1 | 10/2015 | Ghoshal et al. | |
| 9,171,306 B1 | 10/2015 | He et al. | |
| 9,172,687 B2 | 10/2015 | Baghdasaryan et al. | |
| 9,396,320 B2 | 7/2016 | Lindemann | |
| 2001/0037451 A1 | 11/2001 | Bhagavatula et al. | |
| 2002/0010857 A1 | 1/2002 | Karthik | |
| 2002/0016913 A1 | 2/2002 | Wheeler et al. | |
| 2002/0040344 A1 | 4/2002 | Preiser et al. | |
| 2002/0073316 A1 * | 6/2002 | Collins | G06F 21/572 713/174 |
| 2002/0073320 A1 | 6/2002 | Rinkevich et al. | |
| 2002/0087894 A1 | 7/2002 | Foley et al. | |
| 2002/0112170 A1 | 8/2002 | Foley et al. | |
| 2002/0174344 A1 | 11/2002 | Ting | |
| 2002/0174348 A1 | 11/2002 | Ting | |
| 2003/0055792 A1 | 3/2003 | Kinoshita et al. | |
| 2003/0065805 A1 | 4/2003 | Barnes | |
| 2003/0084300 A1 | 5/2003 | Koike | |
| 2003/0087629 A1 | 5/2003 | Juitt | |
| 2003/0115142 A1 | 6/2003 | Brickell et al. | |
| 2003/0135740 A1 | 7/2003 | Talmor et al. | |
| 2003/0152252 A1 | 8/2003 | Kondo et al. | |
| 2003/0226036 A1 | 12/2003 | Bivens et al. | |
| 2003/0236991 A1 | 12/2003 | Letsinger | |
| 2004/0101170 A1 | 5/2004 | Tisse | |
| 2004/0123153 A1 | 6/2004 | Wright et al. | |
| 2005/0021964 A1 | 1/2005 | Bhatnagar et al. | |
| 2005/0080716 A1 | 4/2005 | Belyi et al. | |
| 2005/0097320 A1 | 5/2005 | Golan et al. | |
| 2005/0125295 A1 | 6/2005 | Tidwell et al. | |
| 2005/0160052 A1 | 7/2005 | Schneider | |
| 2005/0187883 A1 | 8/2005 | Bishop et al. | |
| 2005/0223236 A1 * | 10/2005 | Yamada | G06K 9/00006 713/186 |
| 2005/0278253 A1 | 12/2005 | Meek et al. | |
| 2006/0026671 A1 | 2/2006 | Potter et al. | |
| 2006/0029062 A1 | 2/2006 | Rao | |
| 2006/0156385 A1 | 7/2006 | Chiviendacz et al. | |
| 2006/0161435 A1 | 7/2006 | Atef et al. | |
| 2006/0161672 A1 | 7/2006 | Jolley et al. | |
| 2006/0282670 A1 | 12/2006 | Karchov | |
| 2007/0005988 A1 | 1/2007 | Zhang et al. | |
| 2007/0077915 A1 | 4/2007 | Black et al. | |
| 2007/0088950 A1 | 4/2007 | Wheeler et al. | |
| 2007/0100756 A1 | 5/2007 | Varma | |
| 2007/0106895 A1 | 5/2007 | Huang et al. | |
| 2007/0107048 A1 | 5/2007 | Halls et al. | |
| 2007/0118883 A1 | 5/2007 | Potter et al. | |
| 2007/0165625 A1 | 7/2007 | Elsner | |
| 2007/0168677 A1 | 7/2007 | Kudo | |
| 2007/0169182 A1 | 7/2007 | Wolfond | |
| 2007/0198435 A1 | 8/2007 | Siegal et al. | |
| 2007/0239980 A1 | 10/2007 | Funayama | |
| 2007/0278291 A1 | 12/2007 | Rans et al. | |
| 2007/0286130 A1 | 12/2007 | Shao et al. | |
| 2008/0005562 A1 | 1/2008 | Sather et al. | |
| 2008/0025234 A1 | 1/2008 | Zhu | |
| 2008/0028453 A1 | 1/2008 | Nguyen et al. | |
| 2008/0034207 A1 | 2/2008 | Cam-Winget et al. | |
| 2008/0046334 A1 | 2/2008 | Lee et al. | |
| 2008/0046984 A1 * | 2/2008 | Bohmer | H04L 63/0853 726/5 |
| 2008/0049983 A1 * | 2/2008 | Miller et al. | 382/115 |
| 2008/0086759 A1 | 4/2008 | Colson | |
| 2008/0134311 A1 | 6/2008 | Medvinsky | |
| 2008/0141339 A1 | 6/2008 | Gomez et al. | |
| 2008/0172725 A1 | 7/2008 | Fujii et al. | |
| 2008/0209545 A1 | 8/2008 | Asano | |
| 2008/0232565 A1 | 9/2008 | Kutt et al. | |
| 2008/0235801 A1 | 9/2008 | Soderberg et al. | |
| 2008/0271150 A1 | 10/2008 | Boerger et al. | |
| 2008/0289019 A1 | 11/2008 | Lam | |
| 2008/0289020 A1 | 11/2008 | Cameron et al. | |
| 2008/0313719 A1 | 12/2008 | Kaliski, Jr. et al. | |
| 2008/0320308 A1 | 12/2008 | Kostiainen et al. | |
| 2009/0049510 A1 | 2/2009 | Zhang et al. | |
| 2009/0064292 A1 | 3/2009 | Carter et al. | |
| 2009/0089870 A1 | 4/2009 | Wahl | |
| 2009/0100269 A1 | 4/2009 | Naccache | |
| 2009/0116651 A1 | 5/2009 | Liang | |
| 2009/0133113 A1 | 5/2009 | Schneider | |
| 2009/0138724 A1 | 5/2009 | Chiou et al. | |
| 2009/0138727 A1 | 5/2009 | Campello | |
| 2009/0158425 A1 | 6/2009 | Chan et al. | |
| 2009/0183003 A1 | 7/2009 | Haverinen | |
| 2009/0187988 A1 | 7/2009 | Hulten et al. | |
| 2009/0193508 A1 | 7/2009 | Brenneman et al. | |
| 2009/0196418 A1 * | 8/2009 | Tkacik | G06F 21/72 380/46 |
| 2009/0199264 A1 | 8/2009 | Lang | |
| 2009/0204964 A1 * | 8/2009 | Foley | G06F 21/53 718/1 |
| 2009/0235339 A1 | 9/2009 | Mennes et al. | |
| 2009/0271618 A1 * | 10/2009 | Camenisch | G06F 21/445 713/155 |

(56) References Cited

U.S. PATENT DOCUMENTS

| | | |
|---|---|---|
| 2009/0271635 A1* | 10/2009 | Liu .................. G06F 21/32 713/186 |
| 2009/0300714 A1 | 12/2009 | Ahn |
| 2009/0300720 A1 | 12/2009 | Guo et al. |
| 2009/0307139 A1 | 12/2009 | Mardikar et al. |
| 2009/0327131 A1 | 12/2009 | Beenau et al. |
| 2009/0328197 A1 | 12/2009 | Newell |
| 2010/0010932 A1 | 1/2010 | Law et al. |
| 2010/0023454 A1 | 1/2010 | Exton et al. |
| 2010/0029300 A1 | 2/2010 | Chen |
| 2010/0042848 A1 | 2/2010 | Rosener |
| 2010/0062744 A1 | 3/2010 | Ibrahim |
| 2010/0070424 A1 | 3/2010 | Monk |
| 2010/0082484 A1 | 4/2010 | Erhart et al. |
| 2010/0083000 A1 | 4/2010 | Kesanupalli |
| 2010/0094681 A1 | 4/2010 | Almen et al. |
| 2010/0105427 A1 | 4/2010 | Gupta |
| 2010/0107222 A1 | 4/2010 | Glasser |
| 2010/0114776 A1 | 5/2010 | Weller et al. |
| 2010/0169650 A1* | 7/2010 | Brickell ............. H04L 9/3066 713/176 |
| 2010/0175116 A1 | 7/2010 | Gum |
| 2010/0186072 A1 | 7/2010 | Kumar |
| 2010/0192209 A1 | 7/2010 | Steeves et al. |
| 2010/0223663 A1 | 9/2010 | Morimoto et al. |
| 2010/0242088 A1 | 9/2010 | Thomas |
| 2010/0287369 A1 | 11/2010 | Monden |
| 2010/0325427 A1 | 12/2010 | Ekberg et al. |
| 2010/0325664 A1 | 12/2010 | Grebenick et al. |
| 2010/0325684 A1 | 12/2010 | Grebenik |
| 2010/0325711 A1 | 12/2010 | Etchegoyen |
| 2011/0004933 A1 | 1/2011 | Dickinson et al. |
| 2011/0022835 A1 | 1/2011 | Schibuk |
| 2011/0047608 A1 | 2/2011 | Levenberg |
| 2011/0071841 A1 | 3/2011 | Fomenko et al. |
| 2011/0078443 A1 | 3/2011 | Greentstein et al. |
| 2011/0082801 A1 | 4/2011 | Baghdasaryan et al. |
| 2011/0083016 A1 | 4/2011 | Kesanupalli et al. |
| 2011/0093942 A1 | 4/2011 | Koster et al. |
| 2011/0107087 A1 | 5/2011 | Lee et al. |
| 2011/0138450 A1 | 6/2011 | Kesanupalli et al. |
| 2011/0157346 A1 | 6/2011 | Zyzdryn et al. |
| 2011/0167154 A1 | 7/2011 | Bush et al. |
| 2011/0167472 A1 | 7/2011 | Evans et al. |
| 2011/0191200 A1 | 8/2011 | Bayer et al. |
| 2011/0197267 A1 | 8/2011 | Gravel et al. |
| 2011/0219427 A1 | 9/2011 | Hito et al. |
| 2011/0225431 A1 | 9/2011 | Stufflebeam, Jr. et al. |
| 2011/0228330 A1 | 9/2011 | Nogawa |
| 2011/0231911 A1 | 9/2011 | White et al. |
| 2011/0246766 A1* | 10/2011 | Orsini ............... G06F 11/1076 713/160 |
| 2011/0265159 A1 | 10/2011 | Ronda |
| 2011/0279228 A1 | 11/2011 | Kumar |
| 2011/0280402 A1* | 11/2011 | Ibrahim .............. G06F 21/572 380/277 |
| 2011/0296518 A1 | 12/2011 | Faynberg et al. |
| 2011/0307706 A1 | 12/2011 | Fielder |
| 2011/0307949 A1 | 12/2011 | Ronda |
| 2011/0313872 A1 | 12/2011 | Carter et al. |
| 2011/0314549 A1 | 12/2011 | Song et al. |
| 2011/0320823 A1 | 12/2011 | Saroiu et al. |
| 2012/0018506 A1 | 1/2012 | Hammad et al. |
| 2012/0023568 A1 | 1/2012 | Cha et al. |
| 2012/0046012 A1 | 2/2012 | Forutanpour et al. |
| 2012/0075062 A1 | 3/2012 | Osman et al. |
| 2012/0084566 A1 | 4/2012 | Chin et al. |
| 2012/0102553 A1 | 4/2012 | Hsueh et al. |
| 2012/0124639 A1 | 5/2012 | Shaikh et al. |
| 2012/0124651 A1 | 5/2012 | Ganesan |
| 2012/0144461 A1 | 6/2012 | Rathbun |
| 2012/0159577 A1 | 6/2012 | Belinkiy |
| 2012/0191979 A1 | 7/2012 | Feldbau |
| 2012/0203906 A1 | 8/2012 | Jaudon et al. |
| 2012/0204032 A1 | 8/2012 | Wilkings |
| 2012/0210135 A1 | 8/2012 | Panchapakesan et al. |
| 2012/0249298 A1 | 10/2012 | Sovio et al. |
| 2012/0272056 A1 | 10/2012 | Ganesan |
| 2012/0278873 A1 | 11/2012 | Calero et al. |
| 2012/0291114 A1 | 11/2012 | Poliashenko et al. |
| 2012/0313746 A1 | 12/2012 | Rahman et al. |
| 2012/0317297 A1 | 12/2012 | Bailey |
| 2013/0042327 A1 | 2/2013 | Chow |
| 2013/0046976 A1 | 2/2013 | Rosati |
| 2013/0046991 A1 | 2/2013 | Lu et al. |
| 2013/0054967 A1 | 2/2013 | Davoust et al. |
| 2013/0061055 A1 | 3/2013 | Schibuk |
| 2013/0067546 A1 | 3/2013 | Thavasi et al. |
| 2013/0073859 A1 | 3/2013 | Carlson et al. |
| 2013/0086669 A1 | 4/2013 | Sondhi et al. |
| 2013/0090939 A1 | 4/2013 | Robinson |
| 2013/0097682 A1 | 4/2013 | Zeljkovic |
| 2013/0104187 A1 | 4/2013 | Weidner |
| 2013/0104190 A1 | 4/2013 | Simske |
| 2013/0119130 A1 | 5/2013 | Braams |
| 2013/0124285 A1 | 5/2013 | Pravetz et al. |
| 2013/0124422 A1 | 5/2013 | Hubert et al. |
| 2013/0125197 A1 | 5/2013 | Pravetz |
| 2013/0125222 A1 | 5/2013 | Pravetz et al. |
| 2013/0133049 A1 | 5/2013 | Peirce |
| 2013/0133054 A1 | 5/2013 | Davis et al. |
| 2013/0144785 A1 | 6/2013 | Karpenko et al. |
| 2013/0159413 A1 | 6/2013 | Davis et al. |
| 2013/0159716 A1 | 6/2013 | Buck et al. |
| 2013/0160083 A1 | 6/2013 | Schrix et al. |
| 2013/0167196 A1 | 6/2013 | Spencer et al. |
| 2013/0219456 A1 | 8/2013 | Sharma et al. |
| 2013/0227646 A1 | 8/2013 | Haggerty et al. |
| 2013/0239173 A1 | 9/2013 | Dispensa |
| 2013/0282589 A1 | 10/2013 | Shoup et al. |
| 2013/0308778 A1 | 11/2013 | Fosmark et al. |
| 2013/0318343 A1 | 11/2013 | Bjarnason et al. |
| 2013/0337777 A1 | 12/2013 | Deutsch et al. |
| 2013/0346176 A1 | 12/2013 | Alolabi et al. |
| 2014/0002238 A1 | 1/2014 | Taveau et al. |
| 2014/0007215 A1 | 1/2014 | Romano |
| 2014/0013422 A1 | 1/2014 | Janus et al. |
| 2014/0033271 A1 | 1/2014 | Barton et al. |
| 2014/0040987 A1 | 2/2014 | Haugsnes |
| 2014/0044265 A1 | 2/2014 | Kocher et al. |
| 2014/0047510 A1 | 2/2014 | Belton et al. |
| 2014/0066015 A1 | 3/2014 | Aissi |
| 2014/0068746 A1 | 3/2014 | Gonzalez |
| 2014/0075516 A1 | 3/2014 | Chermside |
| 2014/0089243 A1 | 3/2014 | Oppenheimer |
| 2014/0096182 A1 | 4/2014 | Smith |
| 2014/0101439 A1 | 4/2014 | Pettigrew et al. |
| 2014/0109174 A1 | 4/2014 | Barton |
| 2014/0115702 A1 | 4/2014 | Li et al. |
| 2014/0130127 A1 | 5/2014 | Toole et al. |
| 2014/0137191 A1 | 5/2014 | Goldsmith et al. |
| 2014/0164776 A1 | 6/2014 | Hook et al. |
| 2014/0173754 A1 | 6/2014 | Barbir |
| 2014/0188770 A1 | 7/2014 | Agrafioti et al. |
| 2014/0189350 A1 | 7/2014 | Baghdasaryan |
| 2014/0189360 A1 | 7/2014 | Baghdasaryan |
| 2014/0189779 A1 | 7/2014 | Baghdasaryan |
| 2014/0189791 A1 | 7/2014 | Lindemann |
| 2014/0189807 A1 | 7/2014 | Cahill et al. |
| 2014/0189808 A1 | 7/2014 | Mahaffey et al. |
| 2014/0189828 A1 | 7/2014 | Baghdasaryan |
| 2014/0189835 A1 | 7/2014 | Umerley |
| 2014/0201809 A1 | 7/2014 | Choyi et al. |
| 2014/0230032 A1 | 8/2014 | Duncan |
| 2014/0245391 A1 | 8/2014 | Adenuga |
| 2014/0250523 A1 | 9/2014 | Savvides et al. |
| 2014/0258125 A1 | 9/2014 | Gerber et al. |
| 2014/0258711 A1 | 9/2014 | Brannon |
| 2014/0282868 A1 | 9/2014 | Sheller et al. |
| 2014/0282945 A1* | 9/2014 | Smith .................. G06F 21/32 726/6 |
| 2014/0282965 A1* | 9/2014 | Sambamurthy ....... G06F 21/32 726/7 |
| 2014/0289117 A1 | 9/2014 | Baghdasaryan |

(56) References Cited

U.S. PATENT DOCUMENTS

| | | |
|---|---|---|
| 2014/0289820 A1 | 9/2014 | Lindemann et al. |
| 2014/0289833 A1* | 9/2014 | Briceno et al. .................. 726/7 |
| 2014/0289834 A1 | 9/2014 | Lindemann |
| 2014/0298419 A1 | 10/2014 | Boubez |
| 2014/0304505 A1 | 10/2014 | Dawson |
| 2015/0046340 A1 | 2/2015 | Dimmick |
| 2015/0058931 A1 | 2/2015 | Miu et al. |
| 2015/0095999 A1 | 4/2015 | Toth et al. |
| 2015/0134330 A1 | 5/2015 | Baldwin et al. |
| 2015/0142628 A1 | 5/2015 | Suplee et al. |
| 2015/0180869 A1 | 6/2015 | Verma |
| 2015/0244696 A1 | 8/2015 | Ma |
| 2015/0269050 A1 | 9/2015 | Filimonov |
| 2015/0326529 A1 | 11/2015 | Morita |
| 2015/0381580 A1 | 12/2015 | Graham et al. |
| 2016/0036588 A1 | 2/2016 | Thackston |
| 2016/0072787 A1 | 3/2016 | Balabine et al. |
| 2016/0078869 A1 | 3/2016 | Syrdal et al. |
| 2016/0087952 A1 | 3/2016 | Tartz et al. |
| 2016/0087957 A1 | 3/2016 | Shah et al. |
| 2016/0188958 A1 | 6/2016 | Martin |
| 2017/0004487 A1 | 1/2017 | Hagen et al. |
| 2017/0109751 A1 | 4/2017 | Dunkelberger et al. |

FOREIGN PATENT DOCUMENTS

| | | |
|---|---|---|
| CN | 102763111 A | 10/2012 |
| WO | 2005003985 A1 | 1/2005 |
| WO | WO2013/082190 | 6/2013 |
| WO | 2014105994 A2 | 7/2014 |
| WO | 2015130734 A1 | 9/2015 |

OTHER PUBLICATIONS

Chen, Liqun, and Jiangtao Li. "Flexible and scalable digital signatures in TPM 2.0." *Proceedings of the 2013 ACM SIGSAC conference on Computer & communications security*. ACM, 2013.

Chakka, Murali Mohan, et al. "Competition on counter measures to 2-d facial spoofing attacks." *Biometrics (IJCB), 2011 International Joint Conference on*. IEEE, 2011, 6 pages.

Marcialis, Gian Luca, et al. "First international fingerprint liveness detection competition—livdet 2009." *Image Analysis and Processing—ICIAP 2009*. Springer Berlin Heidelberg, 2009. 12-23.

Uludag, Umut, and Anil K. Jain. "Attacks on biometric systems: a case study in fingerprints." *Electronic Imaging 2004*. International Society for Optics and Photonics, 2004, 12 pages.

Ratha, Nalini K., Jonathan H. Connell, and Ruud M. Bolle. "An analysis of minutiae matching strength." *Audio-and Video-Based Biometric Person Authentication*. Springer Berlin Heidelberg, 2001, 7 pages.

Anthony J. Nicholson, "Mobile Device Security Using Transient Authentication," IEEE Transactions on Mobile Computing vol. 5, No. 11, pp. 1489-1502 (Nov. 2006).

Mohammad O. Derawi, "Unobtrusive User-Authentication on Mobile Phones using Biometric Gait Recognition" (2010).

Koichiro Niinuma, Anil K. Jain, "Continuous User Authentication Using Temporal Information" (currently at http://www.cse.msu.edu/biometrics/Publications/Face/NiinumaJain_ContinuousAuth_SPIE10.pdf).

BehavioSec, "Measuring FAR/FRR/EER in Continuous Authentication," Stockholm, Sweden (2009).

The Online Certificate Status Protocol (OCSP, RFC2560).

See current WikiPedia article for "Eye Tracking" at en.wikipedia.org/wiki/Eye_tracking.

(See Hartzell, "Crazy Egg Heatmap Shows Where People Click on Your Website" (Nov. 30, 2012), currently at www.michaelhartzell.com/Blog/bid/92970/Crazy-Egg-Heatmap-shows-where-people-click-on-your-website).

Notification of Transmittal of the International Search Report and the Written Opinion from counterpart Patent Cooperation Treaty Application No. PCT/US13/77888, dated Aug. 8, 2014, 10 pages.

Notification of Transmittal of the International Search Report and the Written Opinion from counterpart Patent Cooperation Treaty Application No. PCT/US14/39627, dated Oct. 16, 2014, 3 pages.

Notification of Transmittal of the International Search Report and the Written Opinion from counterpart Patent Cooperation Treaty Application No. PCT/US14/31344, dated Nov. 3, 2014, 8 pages.

Office Action from U.S. Appl. No. 14/066,384, dated Jan. 7, 2015, 24 pages.

Office Action from U.S. Appl. No. 14/145,439, dated Feb. 12, 2015, 18 pages.

Office Action from U.S. Appl. No. 14/145,533, dated Jan. 26, 2015, 13 pages.

Office Action from U.S. Appl. No. 14/145,607, dated Mar. 20, 2015, 22 pages.

Office Action from U.S. Appl. No. 14/218,551, dated Apr. 23, 2015, 9 pages.

Office Action from U.S. Appl. No. 14/218,575, dated Feb. 10, 2015, 17 pages.

Office Action from U.S. Appl. No. 14/066,273, dated May 8, 2015, 31 pages.

Notice of Allowance from U.S. Appl. No. 14/145,533, dated May 11, 2015, 5 pages.

Notice of Allowance from U.S. Appl. No. 14/145,439, dated Jul. 6, 2015, 6 pages.

Transmittal of International Preliminary Report on Patentability from foreign counterpart PCT/US2013/077888, dated Jul. 9, 2015, 7 pages.

Office Action from U.S. Appl. No. 14/268,733, dated Jul. 16, 2015, 13 pages.

Notification of Transmittal of the International Search Report and the Written Opinion from counterpart Patent Cooperation Treaty Application No. PCT/US2015/028924, dated Jul. 30, 2015, 10 pages.

Office Action from U.S. Appl. No. 14/218,575, dated Aug. 7, 2015, 19 pages.

Final Office Action from U.S. Appl. No. 14/066,384, dated Aug. 20, 2015, 23 pages.

Office Action from U.S. Appl. No. 14/268,619, dated Aug. 24, 2015, 17 pages.

Notice of Allowance from U.S. Appl. No. 14/145,607, dated Sep. 2, 2015, 19 pages.

Final Office Action from U.S. Appl. No. 14/218,551, dated Sep. 9, 2015, 15 pages.

Notice of Allowance from U.S. Appl. No. 14/145,533, dated Sep. 14, 2015, 13 pages.

Notice of Allowance from U.S. Appl. No. 14/448,697, dated Sep. 15, 2015, 14 pages.

Notification of Transmittal of the International Search Report and the Written Opinion from counterpart Patent Cooperation Treaty Application No. PCT/US2015/042785, dated Oct. 16, 2015, 8 pages.

Notification of Transmittal of the International Search Report and the Written Opinion from counterpart Patent Cooperation Treaty Application No. PCT/US2015/042799, dated Oct. 19, 2015, 13 pages.

Office Action from U.S. Appl. No. 14/448,641, dated Nov. 9, 2015, 21 pages.

Barker et al; "Recommendation for key management Part 3: Application-Specific Key Management Guidance"; NIST special Publication 800-57, pp. 1-103, Dec. 2009.

Office Action from U.S. Appl. No. 14/448,814, dated Aug. 4, 2015, 13 pages.

World Wide Web Consortium, W3C Working Draft: Media Capture and Streams (2013).

Office Action from U.S. Appl. No. 14/218,692, dated Nov. 4, 2015, 16 pages.

Notice of Allowance from U.S. Appl. No. 14/145,439, dated Oct. 28, 2015, 12 pages.

Schneier, B., "Biometrics: Uses and Abuses". Aug. 1999. Inside Risks 110 (CACM 42, Aug. 8, 1999). http://www.schneier.com/essay-019.pdf.

Zhao, W., et al. "Face Recognition: A Literature Survey". ACM Computing Surveys, vol. 35, No. 4. Dec. 2003, pp. 399-458.

(56) References Cited

OTHER PUBLICATIONS

Abate, A., et al., "2D and 3D face recognition: A survey". Pattern Recognition Letters. 2007, 28, pp. 1885-1906.
GSM Arena. GSM Arena. [Online] Nov. 13, 2011. [Cited: Sep. 29, 2012.] http://www.gsmarena.com/ice_cream_sandwichs_face_unlock_duped_using_a_photograph-news-3377.php. Downloaded Aug. 18, 2015.
Wilson, R., James. Unbuntu Life, "How to Trick Google's New Face Unlock on Android 4.1 Jelly Bean". Print Screen Mac. [Online] Aug. 6, 2012. [Cited: Sep. 28, 2012.] http://printscreenmac.info/how-to-trick-android-jelly-bean-face-unlock/. downloaded Aug. 13, 2015.
Phillips, P., J., et al., "Face Recognition Vendor Test 2002: Evaluation Report". s.l. : NISTIR 6965, 2002. 56 pages. http://www.face-rec.org/vendors/FRVT_2002_ Evaluation_Report.pdf.
Phillips, P.J., et al., "FRVT 2006 and ICE 2006 Large-Scale Results", NIST IR 7408. Gaithersburg : NIST, 2006. Mar. 29, 2007. pp. 1-55.
Grother, P.J., et al., NIST. Report on the Evaluation of 2D Still-Image Face Recognition Algorithms, NIST IR 7709. s.l. : NIST, 2011. Jun. 22, 2010. pp. 1-58.
Chakka, M., et al., "Competition on Counter Measures to 2-D Facial Spoofing Attacks". 6 pages .2011. http://www.csis.pace.edu/~ctappert/dps/IJCB2011/papers/130.pdf. 978-1-4577-1359-0/11.
Ratha, N., et al., IBM Thomas J. Watson Research Center. An Analysis of Minutiae Matching StrengthP. Hawthorne, NY 10532 : IBM. 7 pages. http://pdf.aminer.org/000/060/741/an_analysis_of_minutiae_matching_strength.pdf.
Roberts, C., "Biometric Attack Vectors and Defences". Sep. 2006. 25 pages. http://otago.ourarchive.ac.nz/bitstream/handle/10523/1243/BiometricAttackVectors.pdf.
Pinto, A., et al., "Video-Based Face Spoofing Detection through Visual Rhythm Analysis". Los Alamitos : IEEE Computer Society Conference Publishing Services, 2012. Conference on Graphics, Patterns and Images, 25. 8 pages.(SIBGRAPI). http://sibgrapi.sid.inpe.br/rep/sid.inpe.br/sibgrapi/2012/07.13.21.16?mirror=sid.inpe.br/banon/2001/03.30.15.38.24&metadatarepository=sid.inpe.br/sibgrapi/2012/07.13.21.16.53.
Li, J., et al., "Live Face Detection Based on the Analysis of Fourier Spectra". Biometric Technology for Human Identification. 2004, pp. 296-303.
Tan, X., et al., "Face Liveness Detection from a Single Image with Sparse Low Rank Bilinear Discriminative Model". s.l. : European Conference on Computer Vision, 2010. pp. 1-14.
Määttä, J., et al., "Machine Vision Group, University of Oulu", Finland. "Face Spoofing Detection From Single Images Using Micro-Texture Analysis". Oulu, Finland : IEEE, 2011. pp. 1-7. http://www.ee.oulu.fi/research/mvmp/mvg/files/pdf/131.pdf.
Heikkilä, M., et al., "A Texture-Based Method for Modeling the Background and Detecting Moving Objects". Oulu : IEEE, Jun. 22, 2005. Draft. 16 pages. http://www.ee.oulu.fi/mvg/files/pdf/pdf_662.pdf.
Peng, Y., et al. "RASL: Robust Alignment by Sparse and Low-rank Decomposition for Linearly Correlated Images". IEEE Conference on Computer Vision and Pattern Recognition. 2010, pp. 763-770. http://yima.csl.illinois.edu/psfile/RASL_CVPR10.pdf.
Kong, S., et al., "Recent advances in visual and infrared face recognition"—a review. Journal of Computer Vision and Image Understanding. Jun. 2005, vol. 1, 97, pp. 103-135.
Kollreider, K., et al., Halmstad University, SE-30118, Sweden. Evaluating Liveness by Face Images and the Structure Tensor. Halmstad, Sweden : s.n., 2005. http://citeseerx.ist.psu.edu/viewdoc/download?doi=10.1.1.62.6534&rep=rep1&type=pdf.
Smiatacz, M., et al., Gdansk University of Technology. Liveness Measurements Using Optical Flow for Biometric Person Authentication. Metrology and Measurement Systems. 2012, vol. XIX, 2. pp. 257-268.
Bao, W., et al., et al.,"A liveness detection method for face recognition based on optical flow field". Image Analysis and Signal Processing, IASP 2009. Apr. 11-12, 2009, pp. 233-236. http://ieeexplore.ieee.org/stamp/stamp.jsp?tp=&arnumber=5054589&isnumber=5054562.
Pan, G., et al., "Liveness Detection for Face Recognition". Recent Advances in Face Recognition. Vienna : I-Tech, 2008, Ch. 9, pp. 109-124, ISBN: 978-953-7619-34-3.
National Science & Technology Council's Subcommittee on Biometrics. Biometrics Glossary. 33 pages, Last updated Sep. 14, 2006. NSTC. http://www.biometrics.gov/documents/glossary.pdf.
Ross, A., et al. "Multimodal Biometrics: An Overview". Proceedings of 12th European Signal Processing Conference (EUSIPCO). Sep. 2004, pp. 1221-1224. http://www.csee.wvu.edu/~ross/pubs/RossMultimodalOverview _EUSIPCO04.pdf.
Rodrigues, R.N., et al. Robustness of multimodal biometric fusion methods against spoof attacks. Journal of Visual Language and Computing. 2009. 11 pages, doi:10.1016/j.jvlc.2009.01.010; http://cubs.buffalo.edu/govind/papers/visual09.pdf.
Akhtar, Z., et al., "Spoof Attacks on Multimodal Biometric Systems". Alfarid. Singapore : IACSIT Press, Singapore, 2011. 2011 International Conference on Information and Network Technology IPCSIT. vol. 4. pp. 46-51. http://www.ipcsit.com/vol4/9-ICINT2011T046.pdf.
Hernandez, T., "But What Does It All Mean? Understanding Eye-Tracking Results (Part 3)", Sep. 4, 2007, 2 pages. EyeTools. Part III: What is a heatmap . . . really? [Online] [Cited: Nov. 1, 2012.] http://eyetools.com/articles/p3-understanding-eye-tracking-what-is-a-heatmap-really.
Nielsen, Jakob. useit.com. Jakob Nielsen's Alertbox—Scrolling and Attention. [Online] Mar. 22, 2010. [Cited: Nov. 1, 2012.] 6 pages. http://www.useit.com/alertbox/scrolling-attention.html.
Nielsen, Jakib. useit.com. Jakob Nielsen's Alertbox—Horizontal Attention Leans Left. [Online] Apr. 6, 2010. [Cited: Nov. 1, 2012.] 4 pages. http://www.useit.com/alertbox/horizontal-attention.html.
Lubin, G., et al., Business Insider. "16 Heatmaps That Reveal Exactly Where People Look". [Online] May 21, 2012. [Cited: Nov. 1, 2012.] pp. 1-21. http://www.businessinsider.com/eye-tracking-heatmaps-2012-5?op=1.
Huang, L., et al., "Clickjacking: Attacks and Defenses". s.l. : Usenix Security 2012, pp. 1-16, 2012. https://www.usenix.org/system/files/conference/usenixsecurity12/sec12-final39.pdf.
Willis, N., Linux.com. Weekend Project: Take a Tour of Open Source Eye-Tracking Software. [Online] Mar. 2, 2012. [Cited: Nov. 1, 2012.] https://www.linux.com/learn/tutorials/550880-weekend-project-take-a-tour-of-open-source-eye-tracking-software.
Chetty, G. School of ISE, University of Canberra, Australia. "Multilevel liveness verification for face-voice biometric authentication". BYSM-2006 Symposium. Baltimore: BYSM-Symposium, 9 pages. Sep. 19, 2006. http://www.biometrics.org/bc2006/presentations/Tues_Sep_19/BSYM/19_Chetty_research.pdf.
Tresadern, P., et al., "Mobile Biometrics (MoBio): Joint Face and Voice Verification for a Mobile Platform". 2012. http://personal.ee.surrey.ac.uk/Personal/Norman.Poh/data/tresadern_PervComp2012 _draft.pdf.
Jafri, R., et al., "A Survey of Face Recognition Techniques. Journal of Information Processing Systems", vol. 5, No. 2, Jun. 2009. Jun. 2009, vol. 5, 2, pp. 41-68. http://www.cosy.sbg.ac.at/~uhl/face_recognition.pdf.
Himanshu, et al., "A Review of Face Recognition". International Journal of Research in Engineering & Applied Sciences. Feb. 2012, vol. 2, 2, pp. 835-846. http://euroasiapub.org/IJREAS/Feb2012/81.pdf.
Phillips, P. J., et al., "Biometric Image Processing and Recognition". Chellappa. 1998. Eusipco .8 pages.
Zhou, et al., "Face Recognition from Still Images and Videos". University of Maryland, College Park, MD 20742. Maryland : s.n., Nov. 5, 2004.pp. 1-23, http://citeseerx.ist.psu.edu/viewdoc/download?doi=10.1.1.77.1312&rep=rep1&type=pdf.
Quinn, G.W., et al., NIST. "Performance of Face Recognition Algorithms on Compressed Images", NIST Inter Agency Report 7830. s.l. : NIST, Dec. 4, 2011.
The Extended M2VTS Database. [Online] [Cited: Sep. 29, 2012.] downloaded Jan. 28, 2015, 1 page; http://www.ee.surrey.ac.uk/CVSSP/xm2vtsdb/.

(56) References Cited

OTHER PUBLICATIONS

Ratha, N. K., et al., IBM. "Enhancing security and privacy in biometrics-based authentication systems". IBM Systems Journal. 2001, vol. 40, 3. pp. 614-634.
Schuckers, S., Schuckers SAC. "Spoofing and Anti-Spoofing Measures". Information Security Technical Report. Dec. 10, 2002, vol. 7, 4., pp. 56-62.
Schwartz, W., et al., "Face Spoofing Detection through Partial Least Squares and Low-Level Descriptors". s.l. : Intl. Joint Conference on Biometrics 2011. pp. 1-8.
Edited by Kresimir Delac, Mislav Grgic and Marian Stewart Bartlett. s.l. : InTech, Jun. 1, 2008. http://cdn.intechopen.com/finals/81/InTech-Recent_advances_ in_face_recognition.zip. ISBN 978-953-7619-34-3. Uploaded as Chapters 1-15.
Pan, G., et al., "Monocular camera-based face liveness detection by combining eyeblink and scene context" pp. 215-225. s.l. : Springer Science+Business Media, LLC, Aug. 4, 2010. http://www.cs.zju.edu.cn/~gpan/publication/2011-TeleSys-liveness.pdf.
Tronci, R, et al., "Fusion of multiple clues for photo-attack detection in face recognition systems". 09010 Pula (CA), Italy : s.n., 2011. pp. 1-6. http://prag.diee.unica.it/pra/system/files/Amilab_IJCB2011.pdf.
Rocha, A., et al., "Vision of the Unseen: Current Trends and Challenges in Digital Image and Video Forensics". s.l. : ACM Computing Surveys, 2010. http://www.wjscheirer.com/papers/wjs_csur2011_forensics.pdf.
Linux.com, The source for Linux information. 2012. 3 pages, downloaded Jan. 28, 2015.
Kollreider, K., et al., "Non-instrusive liveness detection by face images". Image Vis. Comput. (2007). doi:10.1016/j.imavis.2007.05.004, Received Feb. 18, 2006, received in revised form, Jan. 24, 2007 and accepted May 22, 2007. 12 pages.
Notification of Transmittal of the International Search Report and the Written Opinion from counterpart Patent Cooperation Treaty Application No. PCT/US2015/042870, dated Oct. 30, 2015, 9 pages.
Notification of Transmittal of the International Search Report and the Written Opinion from counterpart Patent Cooperation Treaty Application No. PCT/US2015/42827, dated Oct. 30, 2015, 9 pages.
Validity, OSTP Framework, 24 pages, 2010.
Notice of Allowance from U.S. Appl. No. 14/268,686, dated Nov. 5, 2015, 23 pages.
Notification of Transmittal of the International Search Report and the Written Opinion from counterpart Patent Cooperation Treaty Application No. PCT/US15/50348, dated Dec. 22, 2015, 9 pages.
Office Action from U.S. Appl. No. 14/448,868, dated Dec. 3, 2015, 15 pages.
Office Action from U.S. Appl. No. 14/487,992, dated Dec. 31, 2015, 12 pages.
Final Office Action from U.S. Appl. No. 14/268,619, dated Dec. 14, 2015, 10 pages.
Notification of Transmittal of International Search Report and Written Opinion from PCT/US2015/028927, dated Jul. 30, 2015, 12 pages.
Transmittal of International Preliminary Report on Patentability from foreign counterpart PCT Patent Application No. PCT/US2014/039627 dated Dec. 10, 2015, 8 pages.
Notice of Allowance from U.S. Appl. No. 14/448,697, dated Jan. 14, 2016, 23 pages.
Final Office Action from U.S. Appl. No. 14/268,733, dated Jan. 15, 2016, 14 pages.
Notice of Allowance from U.S. Appl. No. 14/145,533, dated Jan. 20, 2016, 12 pages.
Office Action from U.S. Appl. No. 14/218,743, dated Jan. 21, 2016, 12 pages.
Office Action from U.S. Appl. No. 14/218,551, dated Jan. 21, 2016, 11 pages.
Office Action from U.S. Appl. No. 14/218,575, dated Jan. 29, 2016, 25 pages.
Transmittal of International Preliminary Report on Patentability from foreign counterpart PCT Patent Application No. PCT/US2014/031344 dated Oct. 1, 2015, 9 pages.
Notice of Allowance from U.S. Appl. No. 14/145,607, dated Feb. 1, 2016, 28 pages.
Final Office Action from U.S. Appl. No. 14/448,814, dated Feb. 16, 2016, 14 pages.
Final Office Action from U.S. Appl. No. 14/066,273, dated Feb. 11, 2016, 29 pages.
Final Office Action from U.S. Appl. No. 14/218,692, dated Mar. 2, 2016, 24 pages.
Final Office Action from U.S. Appl. No. 14/218,646, dated Mar. 2, 2016, 23 pages.
Notice of Allowance from U.S. Appl. No. 14/145,439, dated Mar. 14, 2016, 17 pages.
Notice of Allowance from U.S. Appl. No. 14/066,384, dated Mar. 17, 2016, 40 pages.
Office Action from U.S. Appl. No. 14/268,619, dated Mar. 21, 2016, 7 pages.
Notice of Allowance from U.S. Appl. No. 14/268,686, dated Mar. 30, 2016, 38 pages.
Non-Final Office Action from U.S. Appl. No. 14/859,328 dated Sep. 15, 2016, 39 pages.
Notice of Allowance from U.S. Appl. No. 14/487,992 dated May 12, 2016, 11 pages.
Notice of Allowance from U.S. Appl. No. 14/218,551, dated Feb. 8, 2017, 8 pages.
Notice of Allowance from U.S. Appl. No. 13/730,761 dated Jun. 10, 2015, 15 pages.
Notice of Allowance from U.S. Appl. No. 13/730,761 dated Sep. 28, 2015, 5 pages.
Notice of Allowance from U.S. Appl. No. 13/730,776 dated Feb. 13, 2015, 16 pages.
Notice of Allowance from U.S. Appl. No. 13/730,776 dated Mar. 24, 2015, 3 pages.
Notice of Allowance from U.S. Appl. No. 13/730,780 dated Aug. 13, 2015, 13 pages.
Notice of Allowance from U.S. Appl. No. 13/730,791 dated Mar. 10, 2015, 17 pages.
Notice of Allowance from U.S. Appl. No. 13/730,795 dated Jan. 14, 2016, 11 pages.
Notice of Allowance from U.S. Appl. No. 13/730,795 dated May 15, 2015, 8 pages.
Notice of Allowance from U.S. Appl. No. 13/730,795 dated Sep. 17, 2015, 11 pages.
Notice of Allowance from U.S. Appl. No. 14/066,384 dated Sep. 27, 2016, 19 pages.
Notice of Allowance from U.S. Appl. No. 14/218,551 dated Feb. 8, 2017, 56 pages.
Notice of Allowance from U.S. Appl. No. 14/218,551 dated Mar. 1, 2017, 7 pages.
Notice of Allowance from U.S. Appl. No. 14/268,619 dated Oct. 3, 2016, 65 pages.
Notice of Allowance from U.S. Appl. No. 14/268,619 dated Jul. 19, 2016, 5 pages.
Notice of Allowance from U.S. Appl. No. 14/268,686 dated Apr. 18, 2016, 16 pages.
Notice of Allowance from U.S. Appl. No. 14/268,686 dated Jul. 8, 2016, 4 pages.
Notice of Allowance from U.S. Appl. No. 14/268,733 dated Sep. 23, 2016, 8 pages.
Notice of Allowance from U.S. Appl. No. 14/268,733 dated Jan. 20, 2017, 62 pages.
Notice of Allowance from U.S. Appl. No. 14/448,641 dated Jun. 7, 2016, 13 pages.
Notice of Allowance from U.S. Appl. No. 14/448,697 dated May 20, 2016, 14 pages.
Notice of Allowance from U.S. Appl. No. 14/448,697 dated Sep. 1, 2016, 3 pages.
Notice of Allowance from U.S. Appl. No. 14/448,868, dated Mar. 23, 2017, 57 pages.
Notice of Allowance from U.S. Appl. No. 14/487,992 dated Dec. 27, 2016, 28 pages.

(56) References Cited

OTHER PUBLICATIONS

Notice of Allowance from U.S. Appl. No. 14/487,992 dated Sep. 6, 2016, 26 pages.
Notification of Transmittal of the International Search Report and the Written Opinion from counterpart Patent Cooperation Treaty Application No. PCT/US2015/042786, dated Oct. 16, 2015, 8 pages.
Notification of Transmittal of the International Search Report and the Written Opinion from counterpart Patent Cooperation Treaty Application No. PCT/US2015/42783, dated Oct. 19, 2015, 13 pages.
Office Action from foreign counterpart Taiwan Patent Application No. 102148853, dated Feb. 17, 2017, 9 pages.
Partial Supplementary European Search Report from European Patent Application No. 14770682.4, dated Oct. 14, 2016, 8 pages.
Requirement for Restriction/Election from U.S. Appl. No. 14/218,504 dated Aug. 16, 2016, 11 pages.
Supplementary Partial European Search Report for Application No. 13867269, dated Aug. 3, 2016, 7 pages.
T. Weigold et al., "The Zurich Trusted Information Channel—An Efficient Defence against Man-in-the-Middle and Malicious Software Attacks," P. Lipp, A.R. Sadeghi, and K.M. Koch, eds., Proc. Trust Conf. (Trust 2008), LNCS 4968, Springer-Verlag, 2008, pp. 75-91.
Vassilev, A.T.; du Castel, B.; Ali, A.M., "Personal Brokerage of Web Service Access," Security & Privacy, IEEE , vol. 5, No. 5, pp. 24-31, Sep.-Oct. 2007.
Zhang, "Security Verification of Hardware-enabled Attestation Protocols," IEEE, 2012, pp. 47-54.
Advisory Action from U.S. Appl. No. 13/730,791 dated Jan. 23, 2015, 4 pages.
Brickell, E., et al., Intel Corporation; Jan Camenish, IBM Research; Liqun Chen, HP Laboratories. "Direct Anonymous Attestation". Feb. 11, 2004, pp. 1-28 [online]. Retrieved from the Internet: URL:https://eprint.iacr.org/2004/205.pdf.
Communication pursuant to Rules 161(2) and 162 EPC for EP Application No. 15826364.0, dated Mar. 7, 2017, 2 pages.
Dawei Zhang; Peng Hu, "Trusted e-commerce user agent based on USB Key", Proceedings of the International MultiConference of Engineers and Computer Scientists 2008 vol. I, IMECS 2008, Mar. 19-21, 2008, Hong Kong, 7 pages.
Doherty, et al., Internet Engineering Task Force (IETF), "Dynamic Symmetric Key Provisioning Protocol (DSKPP)", Dec. 2010, 105 pages.
Extended European Search Report for Application No. 13867269, dated Nov. 4, 2016, 10 pages.
Extended European Search Report for Application No. 14803988.6, dated Dec. 23, 2016, 10 pages.
Extended European Search Report from European Patent Application No. 14770682.4, dated Jan. 17, 2017, 14 pages.
Final Office Action from U.S. Appl. No. 13/730,761 dated Jan. 15, 2015, 31 pages.
Final Office Action from U.S. Appl. No. 13/730,761 dated Jul. 8, 2014, 36 pages.
Final Office Action from U.S. Appl. No. 13/730,776 dated Nov. 3, 2014, 20 pages.
Final Office Action from U.S. Appl. No. 13/730,780 dated Jan. 27, 2015, 30 pages.
Final Office Action from U.S. Appl. No. 13/730,780 dated May 12, 2014, 34 pages.
Final Office Action from U.S. Appl. No. 13/730,791 dated Nov. 13, 2014, 22 pages.
Final Office Action from U.S. Appl. No. 13/730,795 dated Aug. 14, 2014, 20 pages.
Final Office Action from U.S. Appl. No. 14/218,551 dated Sep. 16, 2016, 11 pages.
Final Office Action from U.S. Appl. No. 14/218,575 dated Jul. 7, 2016, 29 pages.
Final Office Action from U.S. Appl. No. 14/218,611, dated Jan. 27, 2017, 14 pages.
Final Office Action from U.S. Appl. No. 14/218,646 dated Aug. 11, 2016, 25 pages.
Final Office Action from U.S. Appl. No. 14/218,692 dated Feb. 28, 2017, 27 pages.
Final Office Action from U.S. Appl. No. 14/218,743 dated Mar. 3, 2017, 67 pages.
Final Office Action from U.S. Appl. No. 14/448,747, dated Feb. 13, 2017, 74 pages.
Final Office Action from U.S. Appl. No. 14/448,814 dated Jun. 14, 2016, 17 pages.
Final Office Action from U.S. Appl. No. 14/448,868 dated Aug. 19, 2016, 11 pages.
Final Office Action from U.S. Appl. No. 14/859,328 dated Mar. 6, 2017, 26 pages.
International Preliminary Report on Patentability for Application No. PCT/US2015/028924 dated Nov. 17, 2016, 9 pages.
International Preliminary Report on Patentability for Application No. PCT/US2015/028927 dated Nov. 17, 2016, 10 pages.
Julian J., et al., "Biometric Enabled Portable Trusted Computing Platform," Trust Security and Privacy in Computing and Communications (TRUSTCOM), 2011 IEEE 10th International Conference on Nov. 16, 2011, pp. 436-442, XP032086831, DOI:10.1109/TRUSTCOM.2011.56, ISBN: 978-1-4577-2135-9.
Non-Final Office Action from U.S. Appl. No. 13/730,761 dated Feb. 27, 2014, 24 pages.
Non-Final Office Action from U.S. Appl. No. 13/730,761 dated Sep. 9, 2014, 36 pages.
Non-Final Office Action from U.S. Appl. No. 13/730,776 dated Jul. 15, 2014, 16 pages.
Non-Final Office Action from U.S. Appl. No. 13/730,780 dated Aug. 4, 2014, 30 pages.
Non-Final Office Action from U.S. Appl. No. 13/730,780 dated Mar. 12, 2014, 22 pages.
Non-Final Office Action from U.S. Appl. No. 13/730,791 dated Jun. 27, 2014, 17 pages.
Non-Final Office Action from U.S. Appl. No. 13/730,795 dated Jan. 5, 2015, 19 pages.
Non-Final Office Action from U.S. Appl. No. 13/730,795 dated Jun. 11, 2014, 14 pages.
Non-Final Office Action from U.S. Appl. No. 14/145,466 dated Sep. 9, 2016, 13 pages.
Non-Final Office Action from U.S. Appl. No. 14/218,504, dated Feb. 27, 2017, 12 pages.
Non-Final Office Action from U.S. Appl. No. 14/218,551 dated May 12, 2016, 11 pages.
Non-Final Office Action from U.S. Appl. No. 14/218,611 dated Jun. 16, 2016, 13 pages.
Non-Final Office Action from U.S. Appl. No. 14/218,646 dated Mar. 10, 2016, 23 pages.
Non-Final Office Action from U.S. Appl. No. 14/218,646, dated Mar. 27, 2017, 24 pages.
Non-Final Office Action from U.S. Appl. No. 14/218,677 dated Aug. 2, 2016, 15 pages.
Non-Final Office Action from U.S. Appl. No. 14/218,677, dated Feb. 10, 2017, 18 pages.
Non-Final Office Action from U.S. Appl. No. 14/218,692 dated Oct. 25, 2016, 33 pages.
Non-Final Office Action from U.S. Appl. No. 14/218,743 dated Aug. 19, 2016, 11 pages.
Non-Final Office Action from U.S. Appl. No. 14/448,747 dated Aug. 19, 2016, 21 pages.
Non-Final Office Action from U.S. Appl. No. 14/448,814 dated Apr. 5, 2017, 57 pages.
Non-Final Office Action from U.S. Appl. No. 14/448,868 dated Dec. 31, 2015, 12 pages.
Non-Final Office Action from U.S. Appl. No. 14/487,992 dated Dec. 3, 2015, 15 pages.
Final Office Action from U.S. Appl. No. 14/218,575, dated Jul. 31, 2017, 42 pages.
First Office Action and Search Report from foreign counterpart China Patent Application No. 201480025959.9, dated Jul. 7, 2017, 10 pages.(Translation available only for Office Action).

(56) References Cited

OTHER PUBLICATIONS

International Preliminary Report on Patentability for Application No. PCT/US2015/042786, dated Feb. 9, 2017, 7 pages.
International Preliminary Report on Patentability for Application No. PCT/US2015/042799, dated Feb. 9, 2017, 7 pages.
International Preliminary Report on Patentability for Application No. PCT/US2015/042870, dated Feb. 9, 2017, 8 pages.
International Preliminary Report on Patentability for Application No. PCT/US2015/050348, dated Mar. 30, 2017, 7 pages.
International Preliminary Report on Patentability for Application No. PCT/US2015/42783, dated Feb. 9, 2017, 12 pages.
International Preliminary Report on Patentability for Application No. PCT/US2015/42827, dated Feb. 9, 2017, 6 pages.
Martins R A., et al., "A Potpourri of Authentication Mechanisms the Mobile Device Way," CISTI, Jan. 2013, pp. 843-848.
Non-Final Office Action from U.S. Appl. No. 14/218,743, dated Aug. 2, 2017, 24 pages.
Non-Final Office Action from U.S. Appl. No. 14/859,328, dated Jul. 14, 2017, 29 pages.
Non-Final Office action from U.S. Appl. No. 15/595,460, dated Jul. 27, 2017, 09 pages.
Notice of Allowance from U.S. Appl. No. 14/066,384, dated Jul. 26, 2017, 20 pages.
Notice of Allowance from U.S. Appl. No. 14/218,551, dated Aug. 16, 2017, 24 pages.
Notice of Allowance from U.S. Appl. No. 14/448,747, dated Jun. 20, 2017, 14 pages.
Notice of Allowance from U.S. Appl. No. 14/448,868, dated Jun. 26, 2017, 14 pages.
Notice of Allowance from U.S. Appl. No. 14/487,992, dated Jul. 17, 2017, 8 pages.
Notice of Allowance from U.S. Appl. No. 14/487,992, dated Jun. 14, 2017, 14 pages.
Final Office Action from U.S. Appl. No. 14/145,466, dated Apr. 13, 2017, 61 pages.
Kim et al., "Secure User Authentication based on the Trusted Platform for Mobile Devices," EURASIP Journal on Wireless Communications and Networking, pp. 1-15.
Non-Final Office Action from U.S. Appl. No. 14/218,575, dated May 4, 2017, 88 pages.
Non-final Office Action from U.S. Appl. No. 14/268,563, dated Apr. 21, 2017, 83 pages.
Notice of Allowance from U.S. Appl. No. 14/066,384, dated May 23, 2017, 50 pages.
Notice of Allowance from U.S. Appl. No. 14/448,868, dated Apr. 27, 2017, 62 pages.
Notice of Allowance from U.S. Appl. No. 14/487,992, dated Apr. 12, 2017, 14 pages.
TechTarget, What is network perimeter? Definition from WhatIs.com downloaded from http://searchnetworking.techtarget.com/definition/network-perimeter on Apr. 14, 2017, 5 pages.
Extended European Search Report for Application No. 15786487.7, dated Oct. 23, 2017, 8 pages.
Final Office Action from U.S. Appl. No. 14/218,504, dated Sep. 12, 2017, 83 pages.
Final Office Action from U.S. Appl. No. 14/218,646, dated Sep. 27, 2017, 81 pages.
Final Office Action from U.S. Appl. No. 14/218,677, dated Sep. 28, 2017, 16 pages.
Final Office Action from U.S. Appl. No. 14/268,563, dated Nov. 3, 2017, 46 pages.
Final Office Action from U.S. Appl. No. 14/448,814 dated Oct. 6, 2017, 24 pages.
First Office Action and Search Report from foreign counterpart China Patent Application No. 201380068869.3, dated Sep. 19, 2017, 15 pages. (translation available only for office action).
Non-Final Office Action from U.S. Appl. No. 14/218,611, dated Sep. 19, 2017, 76 pages.
Non-Final Office Action from U.S. Appl. No. 14/218,692, dated Sep. 19, 2017, 37 pages.
Non-Final Office Action from U.S. Appl. No. 15/396,452 dated Oct. 13, 2017, 76 pages.
What is network perimeter?—Definition from WhatIs.com, Tech Target, Posted by: Margaret Rouse downloaded from http://searchnetworking.techtarget.com/definition/network-perimeter on Apr. 14, 2017, 5 pages.
Extended European Search Report for Application No. 15786796.1, dated Nov. 3, 2017, 9 pages.
Extended European Search Report for Application No. 15826660.1, dated Nov. 16, 2017, 9 pages.
Extended European Search Report for Application No. 15827334.2, dated Nov. 17, 2017, 8 pages.
International Search Report and Written Opinion for Application No. PCT/US2017/045534, dated Nov. 27, 2017, 14 pages.
Kim H.C., et al., "A Design of One-Time Password Mechanism Using Public Key Infrastructure," Networked Computing and Advanced Information Management, 2008, NCM'08, 4th International Conference on IEEE, Sep. 2, 2008, pp. 18-24.
Notice of Allowance from U.S. Appl. No. 14/066,384, dated Dec. 1, 2017, 23 pages.
Notice of Allowance from U.S. Appl. No. 14/218,551, dated Dec. 13, 2017, 13 pages.
Notice of Allowance from U.S. Appl. No. 14/448,868, dated Nov. 17, 2017, 15 pages.
Office Action and Search Report from foreign counterpart Chinese Patent Application No. 201480031042.X, dated Dec. 4, 2017, 20 pages.
Starnberger G., et al., "QR-TAN: Secure Mobile Transaction Authentication," Availability, Reliability and Security, 2009, ARES'09, International Conference on IEEE, Mar. 16, 2009, pp. 578-585.
Uymatiao M.L.T., et al., "Time-based OTP authentication via secure tunnel (TOAST); A mobile TOTP scheme using TLS seed exchage and encrypted offline keystore," 2014 4th IEEE International Conference on Information Science and Technology, IEEE, Apr. 26, 2014, pp. 225-229.

\* cited by examiner

SYSTEM AND METHOD FOR BIOMETRIC AUTHENTICATION WITH DEVICE ATTESTATION

CLAIM TO PRIORITY

This application claims the benefit of U.S. Provisional Patent Application No. 61/829,081, filed May 30, 2013, entitled, "Combining Biometric Authentication With Device Attestation" which is assigned to the assignee of the present nonprovisional application and is hereby incorporated by reference.

BACKGROUND

Field of the Invention

This invention relates generally to the field of data processing systems. More particularly, the invention relates to a system and method for biometric authentication with device attestation.

Description of Related Art

Existing systems have been designed for providing secure user authentication over a network using biometric sensors. For example, Patent Application No. 2011/0082801 ("'801 Application") describes a framework for user registration and authentication on a network which provides strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc).

Biometric sensors have been used for local computer authentication for years in commercial off-the-shelf computer systems such as Lenovo® Thinkpads® and HP® Elite Books®. Biometric sensors integrated into these computer systems typically can rely on the integrity of the computer system as convenience as opposed to attack resistance is their primary goal. Additionally commercial computer systems typically aren't robust against physical tampering at all. So adding physical protection for the fingerprint sensor alone hasn't been a priority.

While biometric devices have been used for remote authentication to certain applications, strict organizational methods have been required to protect the integrity of biometric systems. For example, these biometric systems are typically sealed and their interface to computer systems is accessible only to authorized and trusted personnel (e.g., a trusted individual or group which ensures that a known acceptable biometric device is used and is not tampered with).

With the increased adoption of cloud services, a new use case for biometric authentication has evolved, i.e., biometric-based authentication to cloud services. In this case, at least the biometric sensor may be attached to an unsupervised machine. This unsupervised case has two important consequences:

a) The biometric device should have integrated anti-spoofing methods (i.e. detection of fake biometrics) as there is no supervisor checking the system is not being spoofed; and b) The machine's and the biometric device's integrity cannot be assumed to be protected by external methods and hence need their own shielding mechanisms.

The need for (a) is well identified and addressed by the research community (Murali Mohan Chakka, 2011) (Marcialis, 2009) (Umut Uludag, Anil K. Jain; Department of Computer Science and Engineering, Michigan State University). However, techniques for (b) have yet to be fully developed. In particular, there are currently no standardized techniques for an Application to determine whether it is communicating with a real biometric device or with a piece of malware. Additionally, no acceptable techniques exist for a remote relying party such as a cloud service to determine whether a request to access the service is being sent by a trusted Application or by malware.

FIG. 1 illustrates an exemplary client 120 with a biometric device 100. When operated normally, a biometric sensor 102 reads raw biometric data from the user (e.g., capture the user's fingerprint, record the user's voice, snap a photo of the user, etc) and a feature extraction module 103 extracts specified characteristics of the raw biometric data (e.g., focusing on certain regions of the fingerprint, certain facial features, etc). A matcher module 104 compares the extracted features 133 with biometric reference data 110 stored in a secure storage on the client 120 and generates a score 135 based on the similarity between the extracted features and the biometric reference data 110. The biometric reference data 110 is typically the result of an enrollment process in which the user enrolls a fingerprint, voice sample, image or other biometric data with the device 100. An application 105 may then use the score 135 to determine whether the authentication was successful (e.g., if the score is above a certain specified threshold).

An attacker may target various locations 130-136 within the biometric pipeline. At 130, for example, the attacker may submit fake biometric data to the biometric sensor 102 (e.g., submitting a recording of the user's voice or a photo of the user's fingerprint). At 131, the attacker may re-submit an old signal containing previously-captured features to the feature extraction module 103 or, at 132, may override the feature extraction function entirely. At 133, the attacker may tamper with feature representation provided to the matcher 104 or, at 134, may override the matching function. At 136, the attacker may provide forged biometric reference data to the matcher 104 or, at 135, may provide a forged score to the application 105. Thus, as illustrated in FIG. 1, there are numerous locations within the biometric pipeline which may be susceptible to targeting by an attacker.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below are embodiments of an apparatus, method, and machine-readable medium for implementing an authentication framework with device attestation in a client-server environment. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve client devices with authentication capabilities such as biometric devices or PIN entry. These devices are sometimes referred to herein as "tokens," "authentication devices," or "authenticators." Various different biometric devices may be used including, but not limited to, fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user). The authentication capabilities may also include non-biometric devices such as trusted platform modules (TPMs) and smartcards.

As mentioned above, in a mobile biometric implementation, the biometric device may be remote from the relying party. As used herein, the term "remote" means that the biometric sensor is not part of the security boundary of the computer it is communicatively coupled to (e.g., it is not embedded into the same physical enclosure as the relying party computer). By way of example, the biometric device may be coupled to the relying party via a network (e.g., the Internet, a wireless network link, etc) or via a peripheral input such as a USB port. Under these conditions, there may be no way for the relying party to know if the device is one which is authorized by the relying party (e.g., one which provides an acceptable level of authentication and integrity protection) and/or whether a hacker has compromised the biometric device. Confidence in the biometric device depends on the particular implementation of the device.

One embodiment of the invention employs cryptographic attestation to ensure to the relying party that the correct biometric device is being used. The biometric device may enter into a cryptographic attestation transaction with the relying party to verify the type of sensor it has. In particular, a cryptographic engine with a secure attestation key storage is included with the biometric device to provide for secure attestation to the relying parties.

Figure 1:
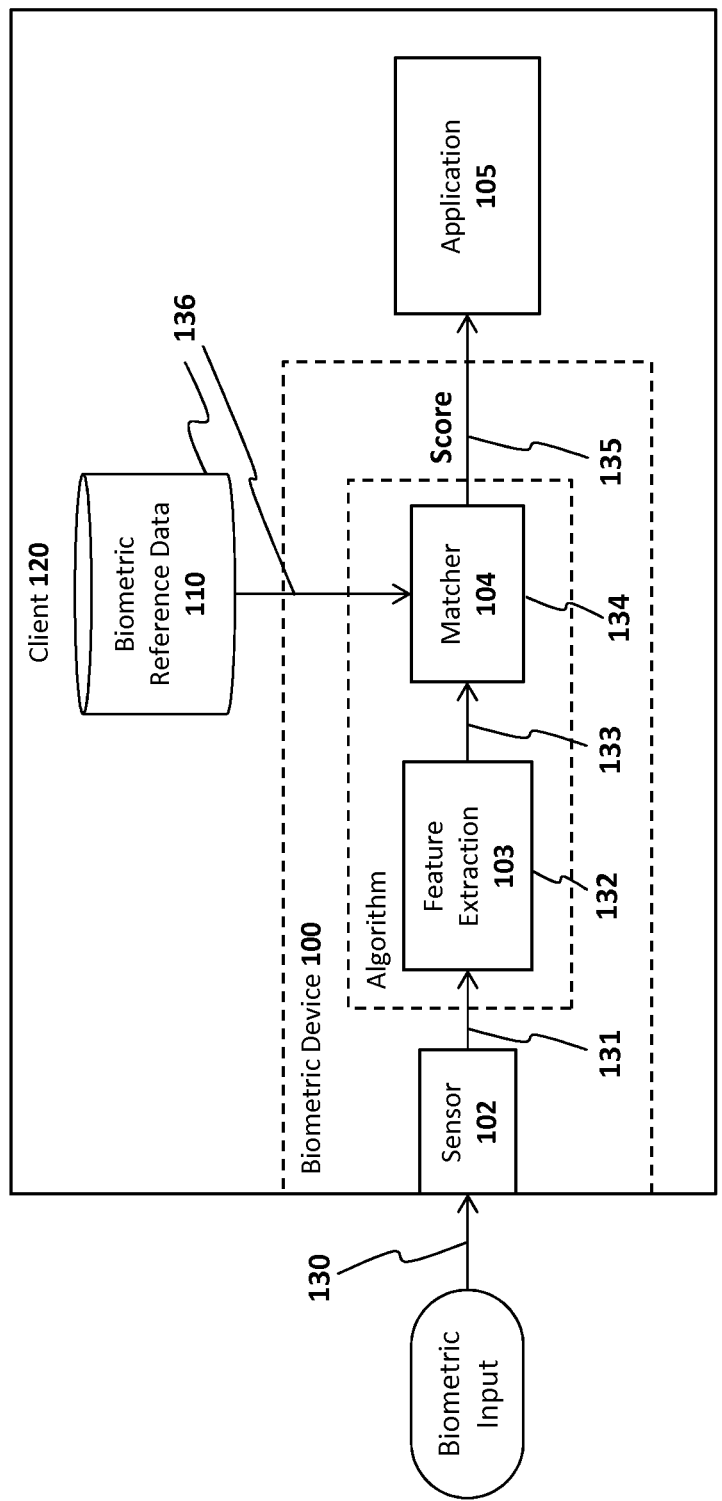
FIG. 1 illustrates an exemplary client equipped with a biometric device.
Figure 2:
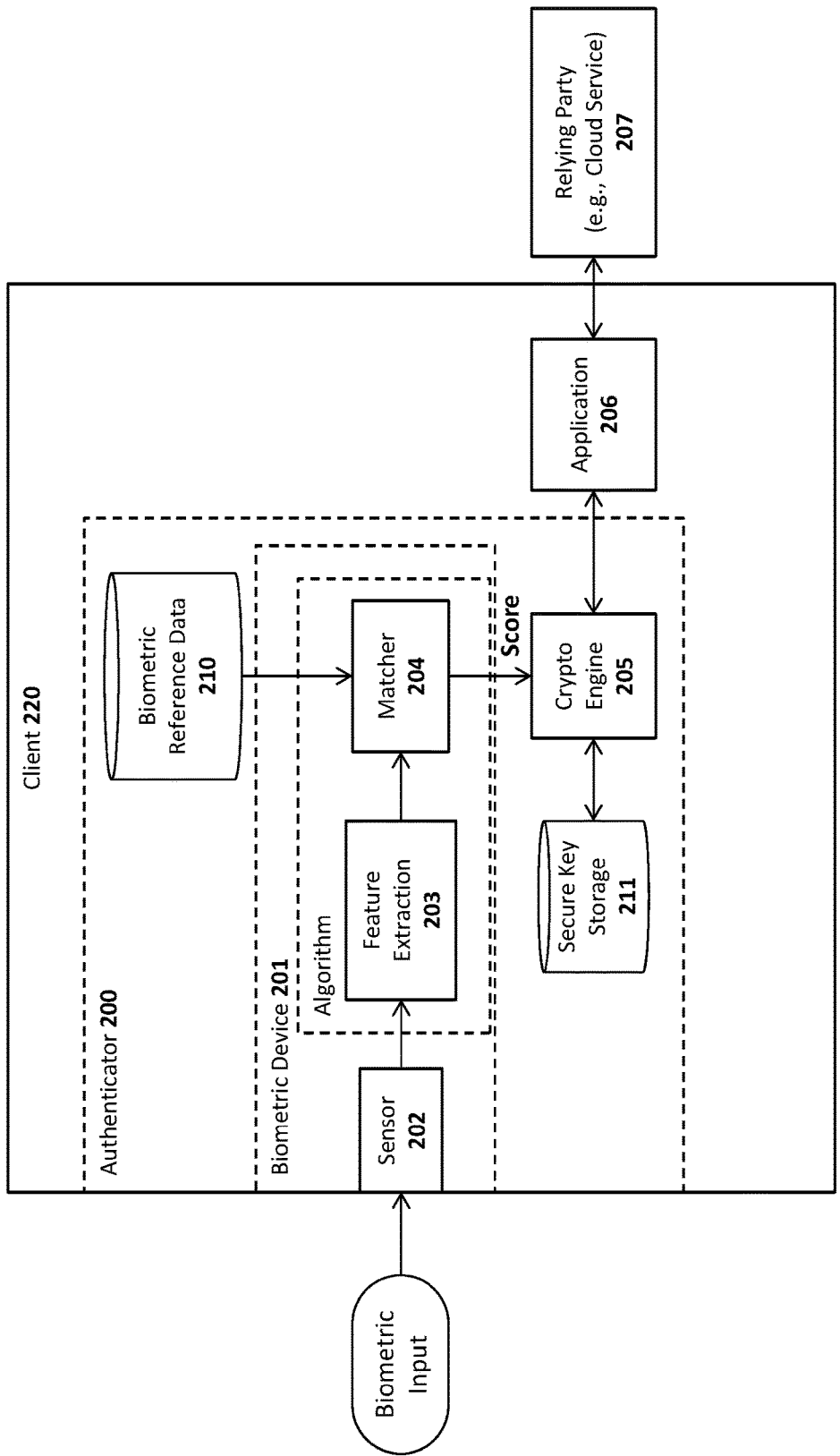
FIG. 2 illustrates one embodiment of a system architecture for biometric authentication with device attestation.

FIG. 2 illustrates one embodiment of the invention which includes a cryptographic engine 205 for attesting to the model and/or the integrity of an Authenticator 200. In particular, as discussed in detail below, the cryptographic engine 205 performs an attestation transaction with a relying party 207 to prove the integrity of the Authenticator 200. In this embodiment, the relying party 207 will trust the score generated by the matcher 204 only if it is also able to verify the proof of integrity of the Authenticator 200. As indicated in FIG. 2, in one embodiment, the relying party 207 may be a cloud service. However, the underlying principles of the invention are not limited to any particular type of relying party.

In operation, the cryptographic engine 205 is provided with access to a secure key storage 211 for storing an attestation key used during the attestation transaction. For example, the key may be a private key stored in the Authenticator 200 at manufacture time and the relying party 207 may store a corresponding public key. However, the underlying principles of the invention are not limited to any particular asymmetric or symmetric key implementation.

In one embodiment, the biometric device includes additional protection logic that protects the attestation key. In response to detecting attempt to tamper with the key, the protection logic automatically erases the key. In one embodiment, secure key storage 211 may be the same secure storage as that used to store the biometric reference data 210, although the underlying principles of the invention are not limited to this implementation.

Figure 3A:
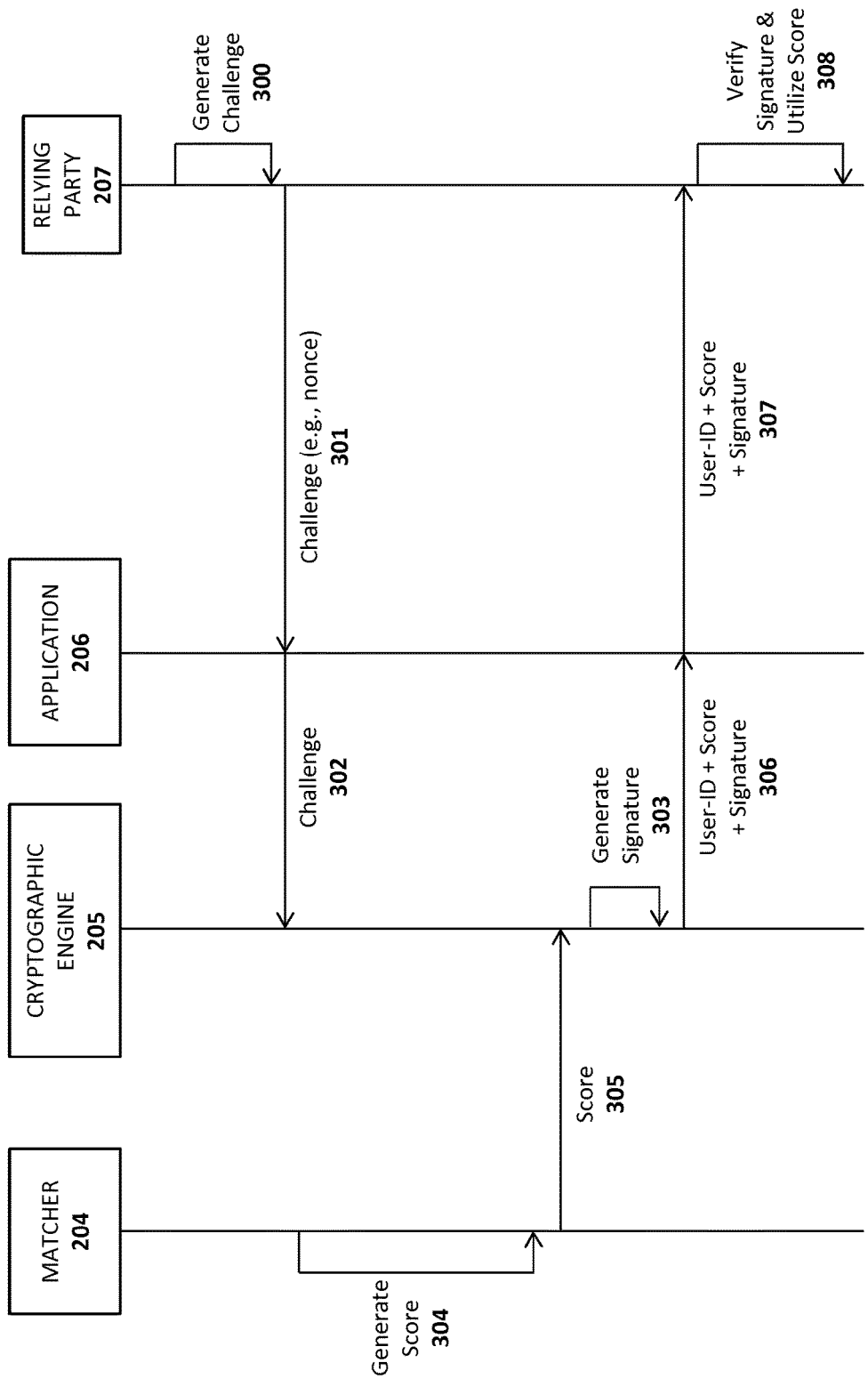
FIG. 3A-C illustrate transaction diagrams showing exemplary transactions between a relying party and a cryptographic engine on a biometric device.

FIG. 3a illustrates a series of attestation transactions employed in one embodiment of the invention. The relying party 207 generates a challenge in transaction 300 and sends it to the application 206 in transaction 301, which forwards it to the cryptographic engine 205 in transaction 302. In one embodiment, the challenge is a random number or nonce selected by the relying party 207. In operation 303, the cryptographic engine 205 generates a signature over the challenge and the score using the attestation key. As is understood by those of skill in the art, generating a signature may involve implementing a hash function over the challenge using the attestation key.

The matcher 204 generates a score in operation 304 and provides the score together with the User-ID to the cryptographic engine 205 in operation 305. Generating the score may be performed as previously described. For example, the biometric sensor 202 may read raw biometric data from the user (e.g., capture the user's fingerprint, record the user's voice, snap a photo of the user, etc) and a feature extraction module 203 may extract specified characteristics of the raw biometric data (e.g., focusing on certain regions of the fingerprint, certain facial features, etc). The matcher module 204 compares the extracted features with biometric reference data 210 stored in a secure storage on the client 220 and generates a score based on the similarity between the extracted features and the biometric reference data 210. As previously described, the biometric reference data 210 may be the result of an enrollment process in which the user enrolls a fingerprint, voice sample, image or other biometric data with the Authenticator 200. The application 206 or relying party 207 may subsequently use the score to determine whether the authentication was successful (e.g., if the score is above a certain threshold needed for the particular transaction).

In operation 306, the cryptographic engine 205 sends the combined signature, User ID, and score to the application 206 which it forwards to the relying party 207 in operation 307. The relying party 207 now knows the challenge (e.g., a nonce or random number which it previously generated) and the signature provided by the cryptographic engine 205. In operation 308, it uses its own key to verify the signature using the random number, thereby verifying the attestation key owned by the cryptographic engine. As mentioned, in one embodiment, the key used by the relying party is a public key for verifying the signature generated on the challenge using the private key. Alternatively, the cryptographic engine and relying party may use the same key (i.e., a symmetric key pair may be used). The underlying principles of the invention are not limited to any particular public/private key implementation. The cryptographic engine simply needs to be capable of generating a signature over the challenge which may be verified by the relying party.

If each biometric device is assigned its own unique attestation key, the key may be used as a global correlation handle for uniquely identifying the user. This creates a privacy problem in some regions of the world. By way of example, the CPUID instruction introduced by Intel® in 1993 could be used to retrieve a CPU's serial number. This feature was subsequently removed in response to privacy concerns.

To address privacy concerns, in one embodiment, the same attestation key may be used for multiple biometric devices. For example, all fingerprint sensors of a certain type (e.g., using a certain type of sensor, or being produced in one batch) may use the same shared attestation key. For example, the shared attestation key may identify a particular biometric device as having a sensor of "type X." Thus, with a shared attestation key, an individual user/device cannot be uniquely identified, thereby preserving each user's privacy.

One disadvantage of this configuration is that if the key is extracted by a potential hacker, the attestation process will be compromised. For this reason, the trusted computing group ("TCG") developed direct anonymous attestation (DAA), a cryptographic protocol which enables remote authentication of a trusted platform while preserving the user's privacy. In one embodiment, DAA is implemented between the relying party 207 and cryptographic engine 205 to attest to the integrity of the Authenticator 200. In particular, the cryptographic engine 205 may comprise a trusted platform module (TPM) and perform attestation and authentication with the relying party 207 as described, for example, in Ernie Brickell et al, Direct Anonymous Attestation (Feb. 11, 2004) or Liqun Chen et al, Flexible and Scalable Digital Signatures in TPM 2.0 (2013).

Using Direct Anonymous Attestation in one embodiment, the Cryptographic Engine 205 can be prepared in two alternative ways before the attestation shown in FIG. 3a can be executed.

Figure 3B:
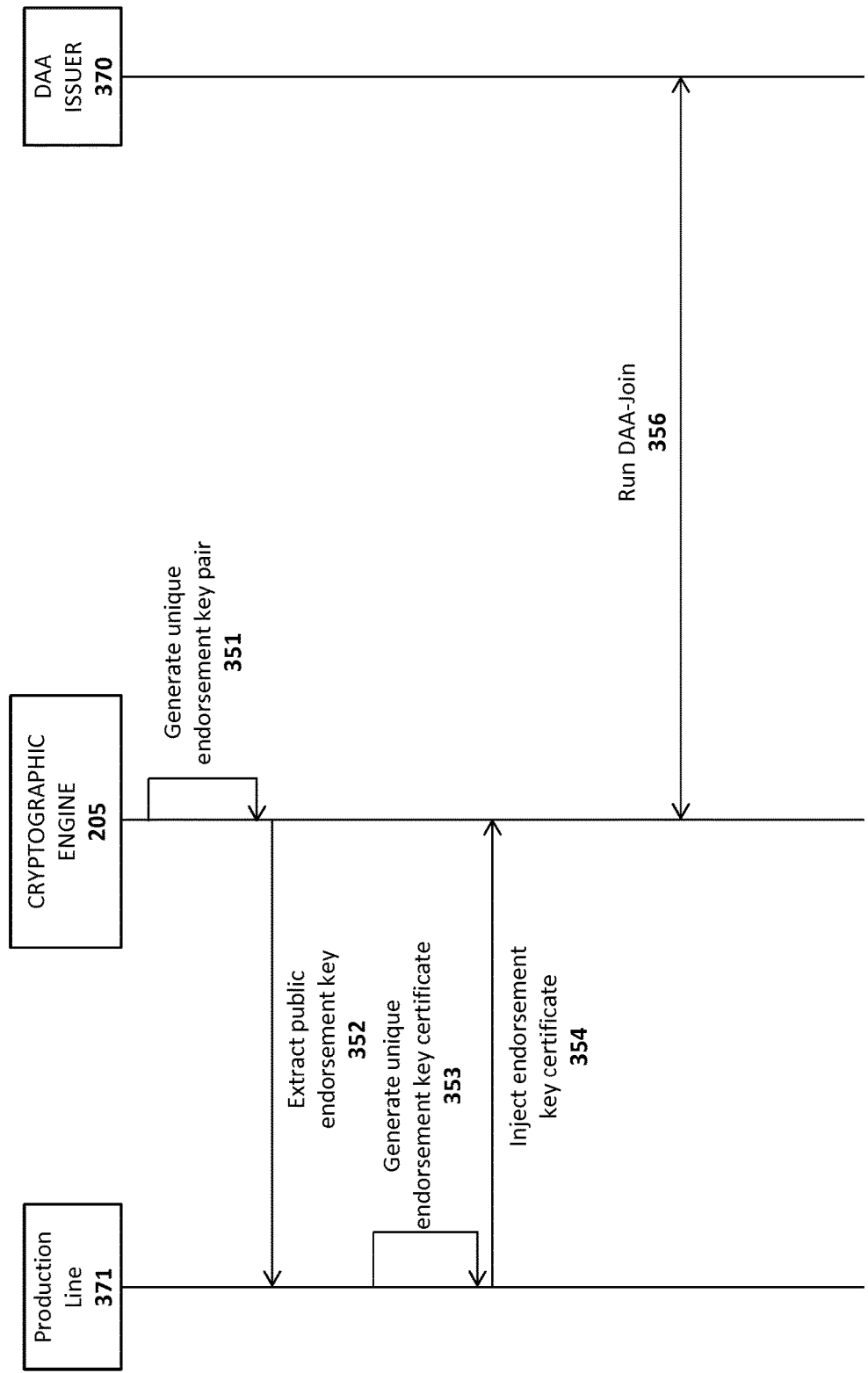

In the embodiment illustrated in FIG. 3b, the DAA Issuer 370 is remote to the production line 371. At the production time of the Authenticator, in operation 351, the endorsement key pair is generated inside the cryptographic engine 205. Alternatively, in one embodiment, it may be injected together with the endorsement key certificate by the production line 371. This key is unique to the Authenticator. This doesn't present a privacy issue as the key is used one single time and only in conjunction with one relying party, the DAA-Issuer. In operation 352, the endorsement public key is extracted and in operation 353, a unique endorsement key certificate is created. In operation 354, the unique endorsement key certificate is injected into the cryptographic engine 205.

In one embodiment, the endorsement certificate is used once, i.e. in conjunction with the DAA-Issuer 370 in order to authenticate itself for the DAA-Join operation, performed at 356. During the DAA-Join operation, a DAA key pair is generated and a DAA "certificate" is sent from the DAA-Issuer to the cryptographic engine.

Figure 3C:
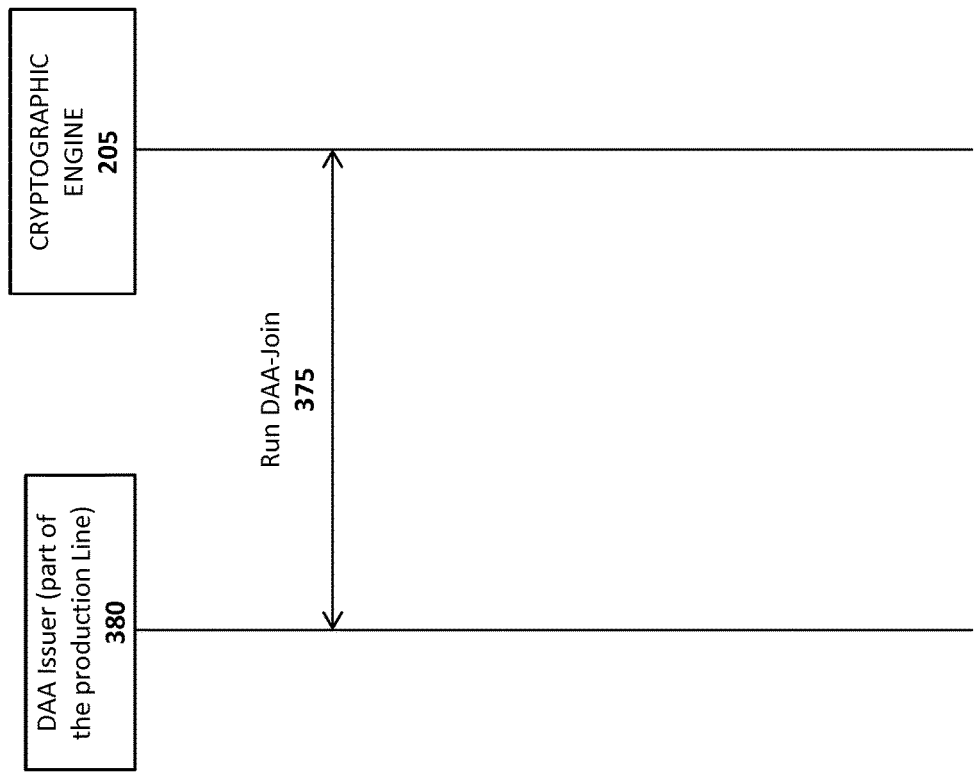

In the embodiment illustrated in FIG. 3c, the DAA Issuer 380 is directly coupled to the production line. In this embodiment, the DAA-Join operation 375 can be performed by the DAA-Issuer (as part of the production line). No additional endorsement key and certificate is required in this embodiment.

Regardless of which embodiment is implemented using DAA, the cryptographic engine 205 will use the DAA-Sign operation instead of the normal signature in step 303 of FIG. 3a.

Exemplary System Architectures

Figure 4A:
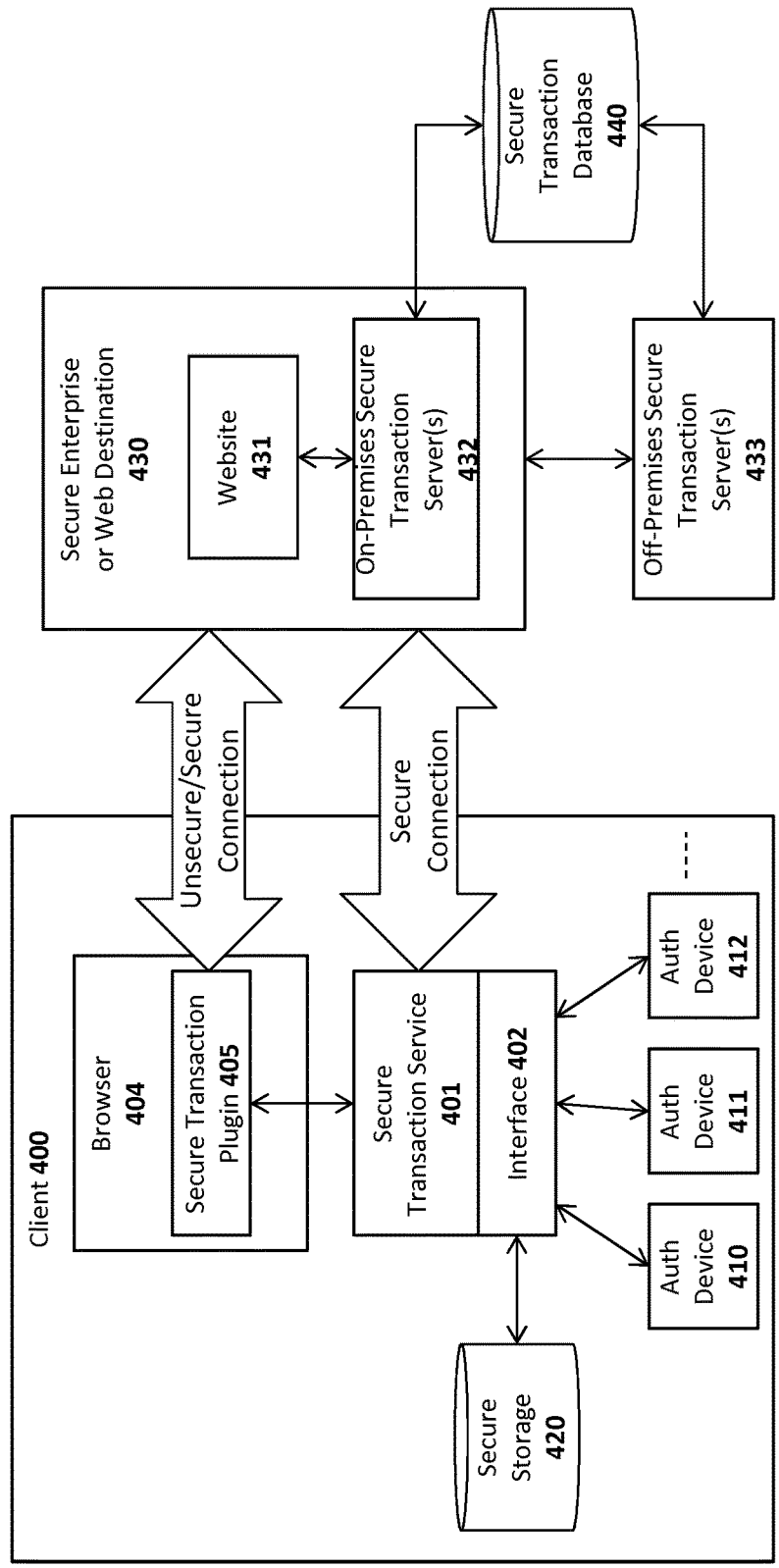
FIGS. 4A-B illustrate two different embodiments of a secure authentication system architecture.
Figure 4B:
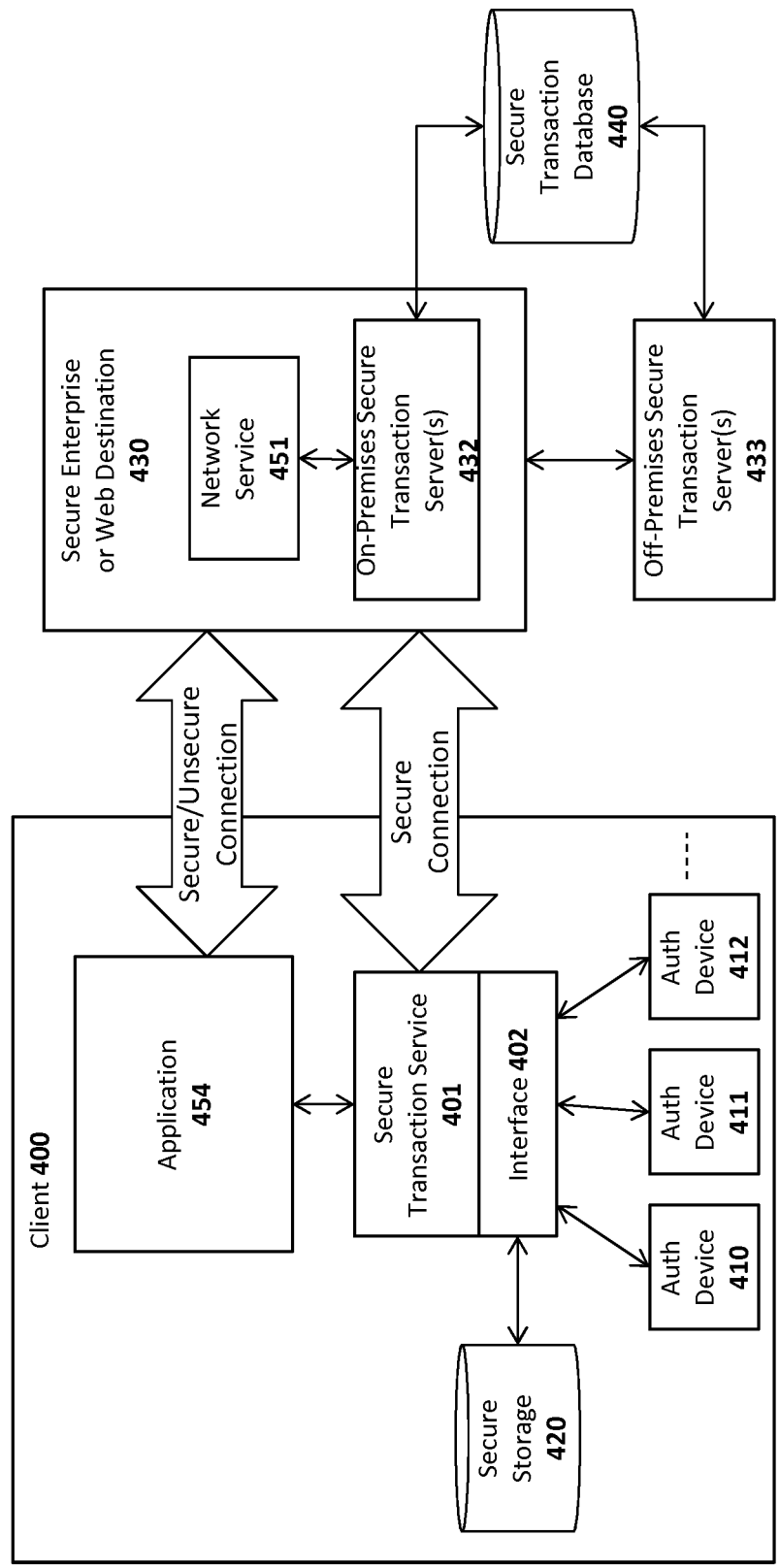

FIGS. 4A-B illustrate two embodiments of a system architecture comprising client-side and server-side components for authenticating a user. The embodiment shown in FIG. 4A uses a browser plugin-based architecture for communicating with a website while the embodiment shown in FIG. 4B does not require a browser. The various techniques described herein for biometric authentication with device attestation using a cryptographic engine may be implemented on either of these system architectures. For example, an authentication device 410-412 and its associated interface 402 shown in FIGS. 4A-B may include the biometric sensor 202, feature extraction module 203, matcher 204, and cryptographic engine 205 shown in FIG. 2. The biometric reference data 210 illustrated in FIG. 2 may be implemented with the secure storage 420 shown in FIGS. 4A-B. While the secure storage 420 is illustrated outside of the secure perimeter of the authentication device(s) 410-412, in one embodiment, each authentication device 410-412 may have its own integrated secure storage. Alternatively, each authentication device 410-412 may cryptographically protect the biometric reference data records (e.g., wrapping them using a symmetric key to make the storage 420 secure).

The application 206 illustrated in FIG. 2 may be the application 454 and/or secure transaction service 401 shown in FIG. 4B. In a browser implementation, the application 206 may be the browser 404/secure transaction plugin 405 and/or the secure transaction service 401 shown in FIG. 4A. The relying party 207 may be the secure enterprise or web destination 430 shown in FIGS. 4A-B. It should be noted, however, that the embodiment illustrated in FIG. 2 stands on its own and may be implemented using logical arrangements of hardware and software other than those shown in FIGS. 4A-B.

Turning first to FIG. 4A, the illustrated embodiment includes a client 400 equipped with one or more authentication devices 410-412 for enrolling and authenticating an end user. As mentioned above, the authentication devices 410-412 may include biometric devices such as fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user) and non-biometric devices such as a trusted platform modules (TPMs) and smartcards.

The authentication devices 410-412 are communicatively coupled to the client through an interface 402 (e.g., an application programming interface or API) exposed by a secure transaction service 401. The secure transaction service 401 is a secure application for communicating with one or more secure transaction servers 432-433 over a network and for interfacing with a secure transaction plugin 405 executed within the context of a web browser 404. As illustrated, the Interface 402 may also provide secure access to a secure storage device 420 on the client 400 which stores information related to each of the authentication devices 410-412 such as a device identification code, user identification code, user enrollment data (e.g., scanned fingerprint or other biometric data), and keys used to perform the secure authentication techniques described herein. For example, as discussed in detail below, a unique key may be stored into each of the authentication devices and used when communicating to servers 430 over a network such as the Internet.

As discussed below, certain types of network transactions are supported by the secure transaction plugin 405 such as HTTP or HTTPS transactions with websites 431 or other servers. In one embodiment, the secure transaction plugin is initiated in response to specific HTML tags inserted into the HTML code of a web page by the web server 431 within the secure enterprise or Web destination 430 (sometimes simply referred to below as "server 430"). In response to detecting such a tag, the secure transaction plugin 405 may forward transactions to the secure transaction service 401 for processing. In addition, for certain types of transactions (e.g., such as secure key exchange) the secure transaction service 401 may open a direct communication channel with the on-premises transaction server 432 (i.e., co-located with the website) or with an off-premises transaction server 433.

The secure transaction servers 432-433 are coupled to a secure transaction database 440 for storing user data, authentication device data, keys and other secure information needed to support the secure authentication transactions described below. It should be noted, however, that the underlying principles of the invention do not require the separation of logical components within the secure enterprise or web destination 430 shown in FIG. 4A. For example, the website 431 and the secure transaction servers 432-433 may be implemented within a single physical server or separate physical servers. Moreover, the website 431 and transaction servers 432-433 may be implemented within an integrated software module executed on one or more servers for performing the functions described below.

As mentioned above, the underlying principles of the invention are not limited to a browser-based architecture shown in FIG. 4A. FIG. 4B illustrates an alternate implementation in which a stand-alone application 454 utilizes the functionality provided by the secure transaction service 401 to authenticate a user over a network. In one embodiment, the application 454 is designed to establish communication sessions with one or more network services 451 which rely on the secure transaction servers 432-433 for performing the user/client authentication techniques described in detail below.

In either of the embodiments shown in FIGS. 4A-B, the secure transaction servers 432-433 may generate the keys which are then securely transmitted to the secure transaction service 401 and stored into the authentication devices within the secure storage 420. Additionally, the secure transaction servers 432-433 manage the secure transaction database 420 on the server side.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

I claim:

1. An apparatus for remotely attesting to authenticator integrity comprising:
   an authenticator to read biometric authentication data from a user and determine whether to successfully authenticate the user based on a comparison with biometric reference data, a score being generated from the comparison; and
   a cryptographic engine comprising a processor and non-transitory machine-readable medium having program code, which, when executed by the processor, causes the cryptographic engine to:
      receive a challenge from a relying party that is outside of a physical enclosure of the apparatus, the challenge comprising a randomly generated nonce,
      sign the challenge and the score using an attestation key to generate an attestation signature, wherein the attestation key is established after an endorsement key certificate is generated, using a product line, specifically for the relying party, wherein the product line extracts a public endorsement key from an endorsement key pair to generate and return the endorsement key certificate to the cryptographic engine, and wherein the endorsement key certificate corresponds to the attestation key, and
      send a user identifier (ID), the score, and the attestation signature to the relying party, wherein the relying party verifies that the attestation signature is valid using a key corresponding to the endorsement key certificate, and wherein the score is used to determine whether the authentication of the user is successful.

2. The apparatus as in claim 1 wherein the cryptographic engine is integrated within the authenticator.

3. The apparatus as in claim 1 wherein the attestation key is a private key and the key of the relying party is a public key associated with the private key.

4. The apparatus as in claim 1 wherein attesting to the integrity of the authenticator comprises implementing a series of direct anonymous attestation (DAA) transactions between the cryptographic engine and the relying party.

5. The apparatus as in claim 4 wherein the DAA transactions include DAA-Sign and DAA-Verify transactions.

6. The apparatus as in claim 1 further comprising:
   protection logic to erase cryptographic data of the cryptographic engine upon detecting tampering with the cryptographic data.

7. The apparatus as in claim 1 wherein the authenticator is to:
   read the biometric authentication data from a user;
   extract specified portions of the biometric authentication data having certain features; and
   compare the specified portions of the biometric authentication data with biometric reference data and responsively generate the score based on the comparison, the score indicating a level of similarity between the specified portions of the biometric authentication data and the biometric reference data.

8. A method for remotely attesting to authenticator integrity comprising:

reading biometric authentication data from a user and determining whether to successfully authenticate the user based on a comparison with biometric reference data, a score being generated from the comparison, wherein the reading and determining are performed by an authenticator; and protecting communication with a relying party that is outside of a physical enclosure of the authenticator; and performing an attestation transaction with the relying party to attest to the integrity of the authenticator to the relying party, the attestation comprising:

receiving a challenge from the relying party, the challenge comprising a randomly generated nonce;

signing the challenge and the score using an attestation key to generate an attestation signature, wherein the attestation key is established after an endorsement key certificate is generated, using a product line specifically for the relying party, wherein the product line extracts a public endorsement key from an endorsement key pair to generate and return the endorsement key certificate for signing the challenge and the score, and wherein the endorsement key certificate corresponds to the attestation key; and sending a user identifier (ID), the score, and the attestation signature to the relying party, wherein the relying party verifies that the attestation signature is valid using a key corresponding to the endorsement key certificate, and wherein the score is used to determine whether the authentication of the user is successful.

9. The method as in claim 8 wherein a cryptographic engine which performs the attestation transaction is integrated within an authenticator that reads the biometric authentication data from the user and determines whether to successfully authenticate the user based on a comparison with the biometric reference data.

10. The method as in claim 8 wherein the attestation key is a private key and the key of the relying party is a public key associated with the private key.

11. The method as in claim 8 wherein attesting to the integrity of the authenticator comprises implementing a series of direct anonymous attestation (DAA) transactions between a cryptographic engine and the relying party.

12. The method as in claim 11 wherein the DAA transactions include DAA-Sign and DAA-Verify transactions.

13. The method as in claim 8 further comprising:
erasing cryptographic data upon detecting tampering with the cryptographic data.

14. The method as in claim 8 wherein determining whether to successfully authenticate the user further comprises:

reading the biometric authentication data from a user;
extracting specified portions of the biometric authentication data having certain features;
comparing the specified portions of the biometric authentication data with biometric reference data and responsively generate the score based on the comparison, the score indicating a level of similarity between the specified portions of the biometric authentication data and the biometric reference data.

15. A non-transitory machine-readable medium having program code stored thereon which, when executed by a machine, causes the machine to perform:

reading biometric authentication data from a user and determining whether to successfully authenticate the user based on a comparison with biometric reference data, a score being generated from the comparison, wherein the operations of reading and determining are performed by an authenticator; and protecting communication with a relying party that is outside of a physical enclosure of the authenticator; and performing an attestation transaction with the relying party to attest to integrity of the authenticator to the relying party, the attestation comprising:

receiving a challenge from the relying party, the challenge comprising a randomly generated nonce;

signing the challenge and the score using an attestation key to generate an attestation signature, wherein the attestation key is established after an endorsement key certificate is generated, using a product line, specifically for the relying party, wherein the product line extracts a public endorsement key from an endorsement key pair to generate and return the endorsement key certificate for signing the challenge and the score, and wherein the endorsement key certificate corresponds to the attestation key; and sending a user identifier (ID), the score, and the attestation signature to the relying party, wherein the relying party verifies that the attestation signature is valid using a key corresponding to the endorsement key certificate, and wherein the score is used to determine whether the authentication of the user is successful.

16. The machine-readable medium as in claim 15 wherein a cryptographic engine which performs the attestation transaction is integrated within an authenticator that reads the biometric authentication data from the user and determines whether to successfully authenticate the user based on a comparison with the biometric reference data.

17. The machine-readable medium as in claim 15 wherein the attestation key is a private key and the key of the relying party is a public key associated with the private key.

18. The machine-readable medium as in claim 15 wherein attesting to the integrity of the authenticator comprises implementing a series of direct anonymous attestation (DAA) transactions between a cryptographic engine and the relying party.

19. The machine-readable medium as in claim 18 wherein the DAA transactions include DAA-Sign and DAA-Verify transactions.

20. The machine-readable medium as in claim 15 further comprising:
erasing cryptographic data upon detecting tampering with the cryptographic data.

21. The machine-readable medium as in claim 15 wherein determining whether to successfully authenticate the user further comprises:

reading the biometric authentication data from a user;
extracting specified portions of the biometric authentication data having certain features;
comparing the specified portions of the biometric authentication data with biometric reference data and responsively generate the score based on the comparison, the score indicating a level of similarity between the specified portions of the biometric authentication data and the biometric reference data.

* * * * *